(12) United States Patent
Canjuga

(10) Patent No.: US 8,931,504 B2
(45) Date of Patent: Jan. 13, 2015

(54) HYDRAULIC AXIAL PISTON REGULATING VALVE AND ITS APPLICATION

(75) Inventor: Slavko Canjuga, Ivanec (HR)

(73) Assignee: Hydromat-Inzenjering D.O.O., Ivanec (HR)

( * ) Notice: Subject to any disclaimer, the term of this patent is extended or adjusted under 35 U.S.C. 154(b) by 559 days.

(21) Appl. No.: 13/321,181

(22) PCT Filed: May 19, 2010

(86) PCT No.: PCT/HR2010/000014
§ 371 (c)(1),
(2), (4) Date: Nov. 18, 2011

(87) PCT Pub. No.: WO2010/133902
PCT Pub. Date: Nov. 25, 2010

(65) Prior Publication Data
US 2012/0061595 A1 Mar. 15, 2012

(30) Foreign Application Priority Data

May 20, 2009 (HR) .............................. P 20090295 A
May 17, 2010 (HR) .............................. P 20100273 A

(51) Int. Cl.
*F16K 1/12* (2006.01)
*F16K 31/02* (2006.01)
*G05B 13/02* (2006.01)
*F16K 31/122* (2006.01)

(52) U.S. Cl.
CPC ............ *F16K 1/126* (2013.01); *F16K 31/1221* (2013.01)
USPC ........... 137/220; 37/554; 251/129.04; 700/42

(58) Field of Classification Search
USPC ......................... 137/219, 220, 222, 554, 556; 251/129.04; 700/42
See application file for complete search history.

(56) References Cited

U.S. PATENT DOCUMENTS 3,566,907 A * 3/1971 Sime et al. .................... 137/219
3,617,151 A * 11/1971 Scroggins ....................... 417/18
(Continued)

FOREIGN PATENT DOCUMENTS

DE 3829726 5/1990
EP 1205697 5/2002
(Continued)

OTHER PUBLICATIONS

WIPO-IB, International Search Report for PCT/HR2010/000014, dated Jan. 20, 2011, 4 pages.

*Primary Examiner* — John K Fristoe, Jr.
*Assistant Examiner* — Kevin Barss
(74) *Attorney, Agent, or Firm* — Dennis R. Haszko

(57) ABSTRACT

The present invention applies to the hydraulic axial piston regulating valve with a linear position sensor, consisting of the valve body (1) and the central part (2), around which the fluid flows when the valve is opened, the hydraulic cylinder (3) with the piston (4) and the piston rod (5), to which the valve regulating piston (12) is firmly fastened. The linear position sensor (8) is placed inside the hydraulic cylinder, and in the electric version of the valve, the sensor with the magnetostrictive waveguide (20) is used. The present invention applies also to the utilization of the linear response of such valves for the regulation purpose using various driving aids; as e.g. electro-hydraulic drive, pneumatic drive or autonomous drive using the energy of the fluid flowing in the pipeline.

15 Claims, 16 Drawing Sheets

(56) References Cited

U.S. PATENT DOCUMENTS

| | | | | |
|---|---|---|---|---|
| 3,734,121 | A | * | 5/1973 | Rowe et al. .................. 137/220 |
| 4,285,495 | A | * | 8/1981 | King ........................... 251/63.5 |
| 4,335,867 | A | * | 6/1982 | Bihlmaier ...................... 251/28 |
| 4,681,130 | A | | 7/1987 | Tabor |
| 4,970,464 | A | | 11/1990 | Williams |
| 5,301,505 | A | * | 4/1994 | Wright ........................... 60/405 |
| 5,348,036 | A | * | 9/1994 | Oksanen et al. ................. 137/1 |
| 5,826,613 | A | * | 10/1998 | Schalk ......................... 137/219 |
| 6,029,691 | A | * | 2/2000 | Tavor ........................... 137/219 |
| 6,263,905 | B1 | | 7/2001 | Yokota et al. |
| 6,293,836 | B1 | * | 9/2001 | Blanchard ...................... 440/47 |
| 7,232,152 | B2 | * | 6/2007 | Isakov et al. .................. 280/736 |
| 7,283,894 | B2 | * | 10/2007 | Esposito et al. ............. 700/282 |
| 7,353,837 | B2 | * | 4/2008 | Biester ......................... 137/219 |
| 2008/0290310 | A1 | | 11/2008 | Unrath |

FOREIGN PATENT DOCUMENTS

| | | |
|---|---|---|
| GB | 532848 | 1/1941 |
| WO | 9714898 | 4/1997 |

* cited by examiner

HYDRAULIC AXIAL PISTON REGULATING VALVE AND ITS APPLICATION

FIELD OF INVENTION

The present invention discloses a hydraulic axial piston regulating valve. The invention belongs to technical field of valves where at least one of the movement components of the valve parts participating in the opening or closing of the valve is perpendicular to the closing area, and where the mentioned valve part is situated in the main fluid stream so that the mentioned fluid streams around the said regulating part while the valve is opened.

The present invention discloses the application of such a valve where the valve is operated using an external energy source or without it.

BACKGROUND OF THE INVENTION

The hydraulic axial piston regulating valve is used in systems where large pressure differences and large flow rates occur, which have to be adjusted in accordance with the needs of the consumer. It is often mounted to inaccessible positions.

It is necessary for the piston regulating valve that it may be incorporated into the pipeline at any position or place. Depending on the mounting position and the regulation demands, beside reliability, the valve must enable accuracy, speed, linearity and repeatability of the flow formation through the vale. It is especially important that the valve design prevents damages due to cavitation, operating noise and vibrations, and the valve itself must be resistant to hydraulic shocks in the system.

The basic technical problem solved by the present invention is the reliable detection and indication of the opened state of the valve, i.e. the position of the valve regulating piston in a linear way.

The second technical problem solved by the present invention is the usage of the linear response of the valve for regulation purposes using various driving means as e.g. electrohydraulic, pneumatic or autonomous drive using the energy of the fluid streaming through the pipeline. The detection of the opened state of the valve must be reliable and linear, if possible.

The third technical problem solved by the present invention is the usage of the valve according to the invention in so called autonomous operation and in the case of the transport of dirty and aggressive fluids as e.g. precipitation, sewer or saltwater, where these fluids have no impact on control reliability.

STATE OF THE ART

State of the art of axial piston regulating valves is abundantly described in the patent literature. The patent published as GB532848 (R. A. Blakebourgh and F. A. Klouman) in 1939 gives instructions on the design of axial piston valves to be mounted into the stream of fluids, where the flow rate regulation is performed by a piston protruding from a housing and which practically reduces the cross section for the fluid flow by its diameter. The piston itself is moved by a mechanical gear transmission. The basic difference to the present invention is in the actuation of the regulating piston. In the present invention the actuation of the regulating piston is hydraulic, and in this state of the art document it is mechanical. This state of the art document also does not indicate any possibility for the indication of the exact position of the piston, which makes it inappropriate for self-regulating purposes. The regulation speed is low due to the used mechanical drive, and there is no safety system (e.g. automatic closing/opening).

The technical solution disclosed in the German patent DE3829726 (J. E. H. Waldenmaier) from 1988 teaches about the application of an axial regulating valve in the procedure of mechanical fluid flow regulation. This means that by controlling of the feedback line by using the fluid pressure from the pipeline, the external mechanism for moving the piston position inside the valve is started in a purely mechanical way by means of a crankshaft. The system mentioned in the state of the art has a relative reproducibility of behaviour and the actuation of the piston itself by purely mechanical means makes this solution in comparison with the present invention more complicated in use and maintenance at the mentioned inaccessible places.

The document published as the patent U.S. Pat. No. 4,681,130 (AR-KAL Plastic Products) from 1986 discloses the design of axial piston valve mounted into the fluid flow stream, where the flow rate is regulated by means of the piston that elongates or shortens from the housing along which the fluid flows. The regulation of position is performed by hydraulic connecting piping, and the entire valve corresponds to the dimensions of the pipeline into which the valve is mounted. According to the inventor, this solution is especially suitable for systems where hydraulic shocks occur. It differs from the present invention in the design detail of hydraulic activation and the way in which the regulating piston is "pulled out", as well as in the absence of a safety system. Furthermore, the discussed technical solution has no piston position sensor, thus it is not suitable for automatic flow rate regulation systems with feedback.

The international patent application PCT/IL96/00109 (TAVOR, Elhanan) from 1996, granted and published as two EP patents EP0854992B1 and EP1205697B1, discloses a design solution which is most similar to the one given by the present invention. The regulation of the position of the piston pullout from the part around which the fluid is streaming is performed hydraulically by means of a spring mechanism, which, in case of pressure loss in the hydraulic part, acts on the piston with a force sufficient to close the valve. This solves the safety part of the problem. In this technical solution, unlike the present invention, there is no reference to a possibility of installation of a piston position sensor that would reliably indicate the state of the valve opening, i.e. the position of the regulating piston. This makes the said technical solution unsuitable for use in systems of automatic fluid flow regulation with feedback, the so called intelligent regulating valve. Furthermore, the solution from PCT/IL96/00109 is inappropriate for the construction of larger valve diameters and larger operating pressures, due to the way in which the regulating piston is guided and the sensitivity of the sealing surfaces to abrasion and other defects it is vulnerable to the flow of polluted fluids.

The application of valves for regulation purposes is disclosed for example in US patent published as U.S. Pat. No. 6,263,905 (YOKOTA Hiroshi; YOKOTA Shingo), which teaches on various autonomous ways of control by means of valves, and that differ in design and properties from the valve according to this invention, and autonomous operation is not possible when they are used for polluted and aggressive fluids.

SUMMARY OF THE INVENTION

The present invention solves earlier technical problems in ways that differ from known solutions:

by having an electric or hydraulic linear position sensor of the regulating piston situated inside the hydraulic cylinder of the central part of the valve;

by the movement of the regulating piston being defined by axial piston guides situated at the inner side of the central part of the valve; and by the fact that the regulating piston is equipped with slots for hydrostatic unloading of the regulating valve.

The regulating piston has in its head a spring which, when compressed, has elastic energy sufficient to always completely close the fluid flow through the valve in the case of pressure loss in the hydraulic channels. This anticipates the safety aspects of functioning of the present invention.

BRIEF DESCRIPTION OF FIGURES

One of the possible designs and applications of the present invention is given in the FIGS. 1-29.

DETAILED DESCRIPTION OF THE INVENTION

As mentioned earlier, the primary application of the hydraulic axial piston regulating valve (hereinafter valve) according to this invention is to regulate the position of the regulating piston at its course in a reliable, exact, quick, linear and repeatable way at minimum vibrations and noise, and to avoid cavitation damage of the valve structure itself during its use. The use of the valve is especially suitable as a regulating valve for the regulation of flow rate and pressure in water, gas and oil transport systems. Its design also makes it ideal for start-up of pumps, quick charging and discharging of reservoir/tank and dam sluices, turbine operation control, as regulating, measuring, isolating (open/close) and safety element in pipelines and water supply networks, for the prevention of hydraulic shocks, as the regulating valve of test stations in the transport of natural gas and generally in the flow regulation segment for various fluids.

Figure 2:
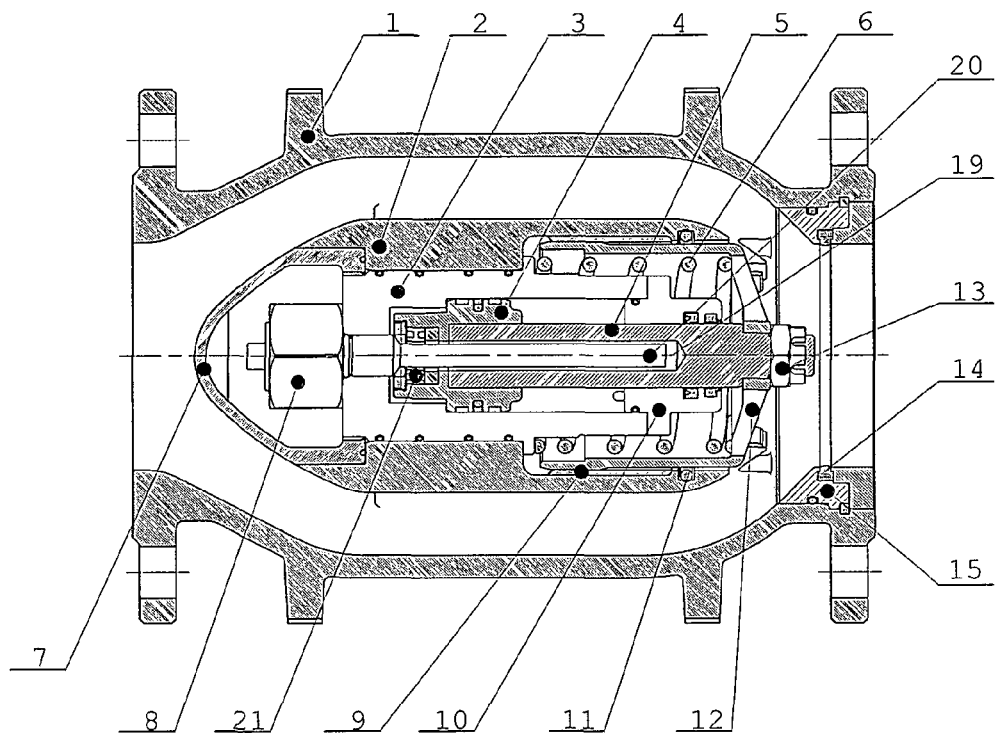
FIG. 2—represents the cross section of the regulating valve not passing through the supporting ribs of the central part of the body.

The valve according to the present invention, by its dimensions of the external body (1) may be easily mounted as a pipeline element where it performs its given task, e.g. to control the fluid flow. The said valve body (1) incorporates all other valve elements and only the body is visible when the valve is built into the pipeline as a part. Inside the said body (1) there is the central part (2) of the valve (FIG. 2), connected to the body by ribs (16). The number of ribs (16) is optimal regarding the hydrodynamic flow resistance of the fluid and the mechanical stress of the valve composition. The valve body (1) and the central part (2) are made of standard materials used in such valve types and are known to the state of the art.

Around the central part (2) and the ribs (16) flows the fluid when the valve is at a certain state of openness. Inside the body (2) there is the hydraulic cylinder (3). Into the hydraulic cylinder (3), through borings—hydraulic channels (17)—situated inside one of the ribs (16) or more of them the pressurized fluid, commonly hydraulic mineral oil, is supplied in order to move the piston (4) and the regulating piston (12) of the valve itself, which is connected to the piston (4). The hydraulic cylinder (3) is closed by the head (10) of the hydraulic cylinder. The hydraulic cylinder body (3) is preferably formed circular at its outside circumference and has grooves (17a) with seals and radial borings for the passage of the pressurized fluid to the piston (4) of the hydraulic cylinder (3) itself. The regulating piston (12) is fastened to the piston rod (5) with the outer nut (13).

The regulating piston (12) has radial grooves or borings for pressure balancing. The grooves and/or borings allow the working fluid to enter the space behind the regulating piston head (12) (in FIG. 2 this is the space with the spring (6)), thus making equal the pressures in front of the regulating piston head (12) and behind it, i.e. in the regulating piston (12). This design minimises the force for the piston (12) movement.

For large nominal diameters of the valve (Φ>300 mm) it is not possible to tighten the regulating piston (12) to the piston rod (5) only with the nut (13), so this joint is substituted with a hinge joint, in a way known to the state of the art. Such a joint allows limited movement of the regulating piston (12) perpendicular to the piston rod movement (5) without transmitting forces or torques to the piston rod (5).

The piston (12) guidance is solved with longitudinal guides (9) fixed to special ribs at the inside of the central part (2), as known in the state of the art. Beside that, the piston rod (5) guidance of the hydraulic cylinder (3) itself contributes to the additional guiding and reduction of vibrations. It is evident that the guidance of the regulating piston (12) through the centre of part (2) of the valve body may be solved in any way known to the state of the art, but the solution with guides seems to be the most simple for a safe and reliable operation.

For small nominal valve diameters (Φ<300 mm) it is possible to design the regulating piston (12) guidance without the guides (9), because in that case the piston rod (5) can take the guidance of the piston (12) by itself and withstand possible forces that are perpendicular to the regulating piston (12) movement.

In the first version of the present invention, at the outside of the hydraulic cylinder (3) the spring (6) is situated, which always moves the regulating piston (12) into the closed position of the valve (1). The said spring (6) leans with one side on the hydraulic cylinder (3) and with the other side on the regulating piston (12) bottom. The spring (6) performs the safety role of rapid return of the piston (12) to the closed position in the case of "breakdown" of the piston hydraulic drive. In this version of the invention, essentially important for the proper and simple functioning are the above described groves/borings at the regulating piston (12) for balancing the pressures in front and behind the piston head (12). This eliminates the need for the elastic force of the spring to overcome also the fluid exhaust pressure forces executed to the regulating piston (12) head.

In the second version—not described in detail by figures—the spring (6) action is entirely replaced by the energy drawn from some pressurized fluid source (27) for the hydraulic cylinder (3) drive. This solution is necessary in the regulating valve designs with large nominal diameters, where the accumulated elastic energy of the spring (6) would not be sufficient to efficiently fulfill its safety role of valve closing in all operating regimes. In this version of the invention, the said design has instead of the spring (6) additional hydraulic channels (17) for pressure control "behind" the piston (4) also, in chamber C2 in the regulation schematics. At the schematic in FIG. 4 the position of the chamber C2 may be seen along with the already existing control of the chamber C1 of the hydraulic cylinder also present in the first version of the invention.

The third version of the present invention—also not presented in detail—represents a combination of the first and second version of the present invention. In this version the spring (6) action is enforced by the energy drawn from some pressurized fluid source (27) for the drive of the hydraulic cylinder (3), the piston (4) position is controlled from one side by the control of chamber C1 of the hydraulic cylinder, and from the other side by pressure control in chamber C2, backed up with the elastic energy accumulated in the spring (6).

In all three versions of the present invention special attention is given to the sealing problem. The sealing of the regulating piston (12) in closed position is performed by means of the seal (11) situated in the central part (2) of the valve and the seal (14) in the exit part (15) of the valve body. The sealing is not necessary when the valve is in the opened position or in an intermediate position because the fluid flows around the regulating piston, thus hydrostatically unloading the regulating piston (12), as described above. Beside that, this design property enables that the said seal (11) is exposed to no or to minimum wear during the regulation play. It is not especially stressed here that the number and the arrangement of the seals (11) and (14) is arbitrary as long as it gives the requested sealing effect of the valve in closed position, which is clear to the expert in this field.

In all the three versions of the invention the indication during the piston (4) position control inside the hydraulic cylinder (3), and at the same time the position of the regulating piston (12) is performed by the linear position sensor (8) placed centrally in the hydraulic cylinder (3).

According to the present invention, it is possible to use two different types of linear position sensors—hydraulic and electrical—depending on the type and way of application of the present invention.

Under the term "electrical position sensor" here a sensor is understood which gives the regulation piston (12) position as a measurable electrical value regardless to the physical cause of the regulating piston (12) position. Under the term "hydraulic position sensor" here a sensor is understood where the position of regulating piston (12) is expressed as a change of some of the mechanically measurable values, e.g. fluid volume or pressure in the hydraulic line connected to this position sensor.

There are several kinds of electric linear position sensors according to type and physical operating principle, but certainly one of the best choices for the practice is the magnetostrictive position sensor. Other sensors known in state of the art may also be used in the present invention.

The magnetostrictive linear sensor as used in one aspect according to the present invention is well known to the state of the art. The operating principle may be seen in e.g. the patent U.S. Pat. No. 4,970,464 and in the corresponding description of the former state of the art of the same document. The design of such a sensor is shown in FIG. 3 and consists of the sensor head (8) with the associated embedded hardware and magnetostrictive waveguide (20), sometimes also called the probe.

Figure 1:
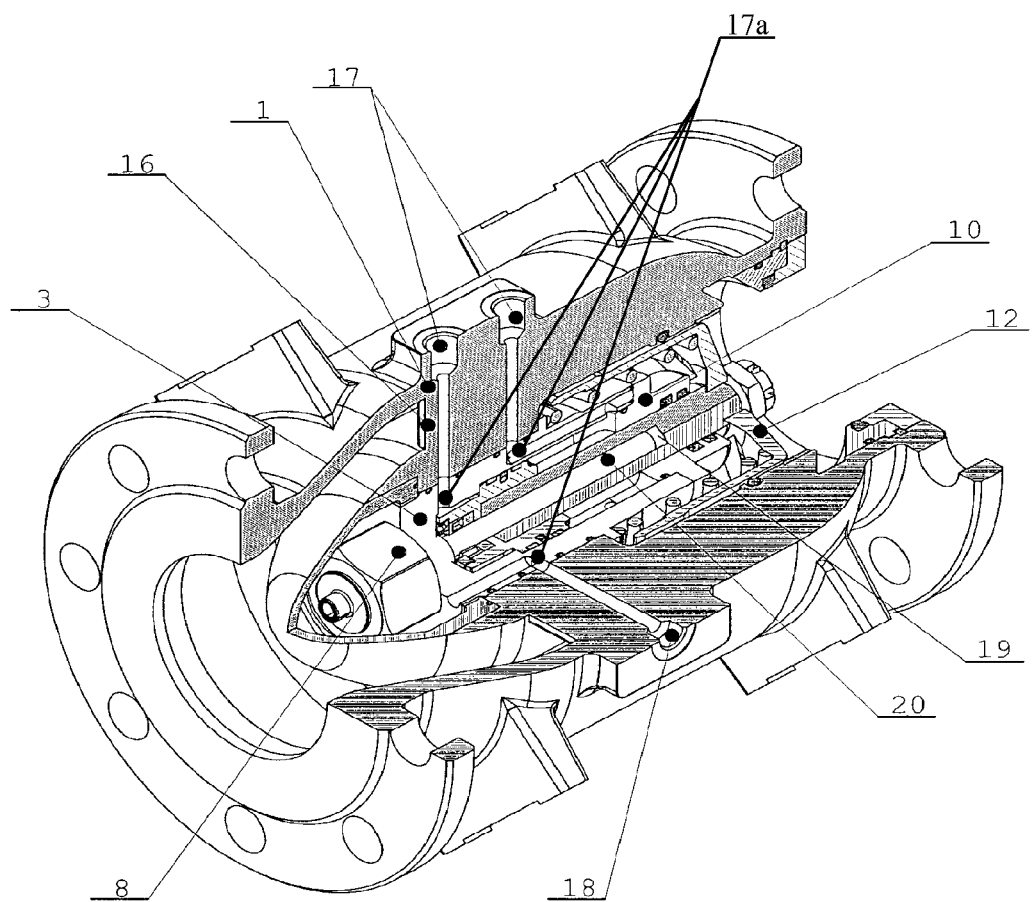
FIG. 1—represents the design of the hydraulic axial piston regulating valve in a three-dimensional view with a partial inside cross section in order to make visible the arrangement of all essential functional parts.
Figure 3:
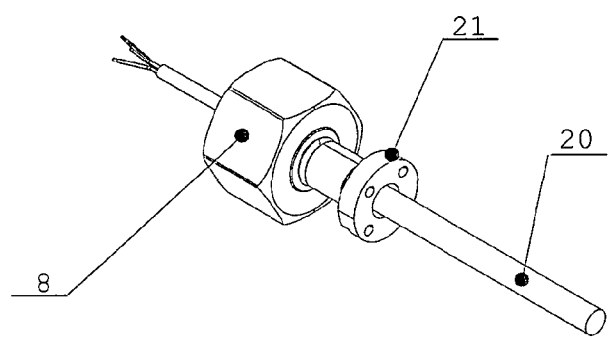
FIG. 3—represents the three dimensional arrangement of the electric position sensor which is built into the axial piston regulating valve.

FIG. 3 represents such a linear magnetostrictive converter with the magnetostrictive waveguide—probe (20) and permanent magnet (21) (FIG. 1) fastened to the piston (4). At the piston (4), i.e. the embedded permanent magnet position, an interaction of the magnetic fields of the magnetostrictive waveguide and the permanent magnet occurs that may be very precisely detected. The difference between the transmission and reception times, i.e. readings of the wave disturbance, the distance (19) or the absolute piston (4) position in relation to the hydraulic cylinder is measured, and thereby indirectly also the position of the regulating piston (12) in the central part of the body (2) of the valve (1).

The registered time response—i.e. distance (19)—is converted into a linear electrical value in the position sensor (8) itself, and as an easily measurable electrical signal value (e.g. voltage, or modulated current signal) it may be conducted by wires through the boring (18) to the processor of the regulating valve (28) for the analysis of the signal concerned. Alternatively, the already existing channels (17) may be used for the conduction, but then additional sealing problems occur. Such positioning of the linear position sensor (8) enables the instantaneous and direct surveillance of the position state of the regulating piston (12), and also for the checking of the response of the piston (4) body system to the hydraulic impulses (commands) sent through the hydraulic channels (17).

Beside electrical linear position sensors (8), special design position sensors may be mounted, and also nonlinear position sensors, but their application demands additional adjustment of the real state of the valve and the actual state of such position sensors by means of numerical adjustments.

If especially precise control of the valve (1) or regulating piston (12) behaviour is needed, the data gathered from the position sensor (8) may additionally be processed in the regulating valve processor (28).

Also known to the state of the art are "Hydraulic" position sensors whose hydraulic output may be linked either to corresponding hydraulic amplifiers which perform the valve control or to analogue position indicators which only indicate the state of the valve openness. The functioning is well known to the state of the art; the Pascal law is utilized. Such position sensors usually comprise a hydraulic piston, hydraulic cylinder and hydraulic line. The hydraulic piston may be connected to the moving (measuring) part, which in this case is the piston (4) while the cylinder of such position sensor is stationary. The change of the distance (19) generates a linear volume change in the hydraulic line of the position sensor. According to the present invention such position sensors are most frequently used in autonomous operating modes, without external energy sources, mostly for external signalization of the openness state of the regulating piston (12) of the valve. The design of the hydraulic position sensor (8) must not "burden" the operation of the control cylinder (3) and piston (4) of the valve and, at the same time, it must fit into the space assigned for the installation of the electrical position sensor described earlier. The hydraulic line of the said hydraulic position sensor may in an appropriate way be led through the boring (18) to the hydraulic amplifier or the analogue state indicator of the regulating piston (12).

At smaller nominal valve diameters (Φ<300 mm), the fastening of the hydraulic cylinder (3) to the central part (2) of the valve body and the closing-in and protection of some of the mentioned position sensors (8) from the transported fluid which flows around part (2) is realized with the cover (7) designed to represent as low as possible flow resistance and to allow the easiest access to the sensor (8) itself when needed. For larger nominal valve diameters the fastening of the hydraulic cylinder (3) to the central part (2) is realized by using a special nut, and the cover (7) is fastened to the central part (2) with special screws.

The valve so designed allows also the fulfillment of all goals mentioned as the technical problem. The key technical characteristics, such as accuracy, linearity, repeatability and the level of possible automation are given by the electrical or hydraulic signals coming from the linear position sensor (8) mounted into the hydraulic cylinder body (3).

The hydrodynamic characteristics and the basic outside design and the flow pattern are known to the state of the art, and it is also known that this design prevents damages of the material due to cavitation, because cavitational activity is focused to areas where there is no material, somewhere behind the nut (13) in the centre of the pipeline, which simultaneously reduces mechanical vibrations (noise) during operation.

The significant improvement of the hydrodynamic characteristics of the invention are the consequence of: the minimal needed cross section of the ribs (16), additional guiding of the regulating piston by the piston (4) and piston rod (5) of the hydraulic cylinder, the powerful spring (6) or using the external hydro-accumulator that significantly reduces vibrations and other undesirable effects in the phase of regulation. The design of the invention allows longer regulation plays—determined by the used hydraulic cylinder (3)—yielding the improvement of the valve regulating characteristics.

The safety aspects of automatic closing are completely solved either by mounting a sufficiently powerful return spring (6) acting autonomously or by using the energy of the fluid drawn from some pressurized fluid source (27), or their combination as discussed earlier in the three possible versions of the invention.

The operating noise is reduced due to design refinements of the cover (7) which separates the fluid flow and forces it to flow around the ribs (16) designed very narrow and in a manner not to be a significant obstruction and not to cause major turbulence. Further noise reduction in relation to other valve types is brought by the design of the outlet part of the valve (15) itself. The outlet part (15) is at the same time the strongest noise source because of the intensive energy conversion in it due to the recombination of the fluid flows flowing around the ribs (16) and the regulating piston (12) in an arbitrary intermediate position. The outlet part (15) may take various designs. The type and shape of the exit part of the valve (1) mostly depend on the pressure difference and flow velocity——as also shown in documents of prior state of the art.

At backward hydraulic shocks occurring e.g. when the valve is in closed position, the forces or pressures respectively are not transferred to the entire diameter of the regulating piston but only to the area difference $\Delta A$:

$$\Delta A = (D_1^2 - D_2^2)/(\pi/4)$$

where $D_1$ is the largest outside diameter of the regulating piston (12) and $D_2$ is the inside diameter of the exit part of the valve (15).

When the valve is in any of the possible intermediate positions—the regulating piston (12) is entirely unloaded, and this property contributes to the great regulation and mechanical reliability of the valve itself.

Application of the Valve

In the following examples and corresponding figures the arrow indicates the fluid flow direction through the valve body (1), and the two-way arrow the motion of the regulating piston (12).

EXAMPLE 1

Closed Loop PID Regulation

Figure 4:
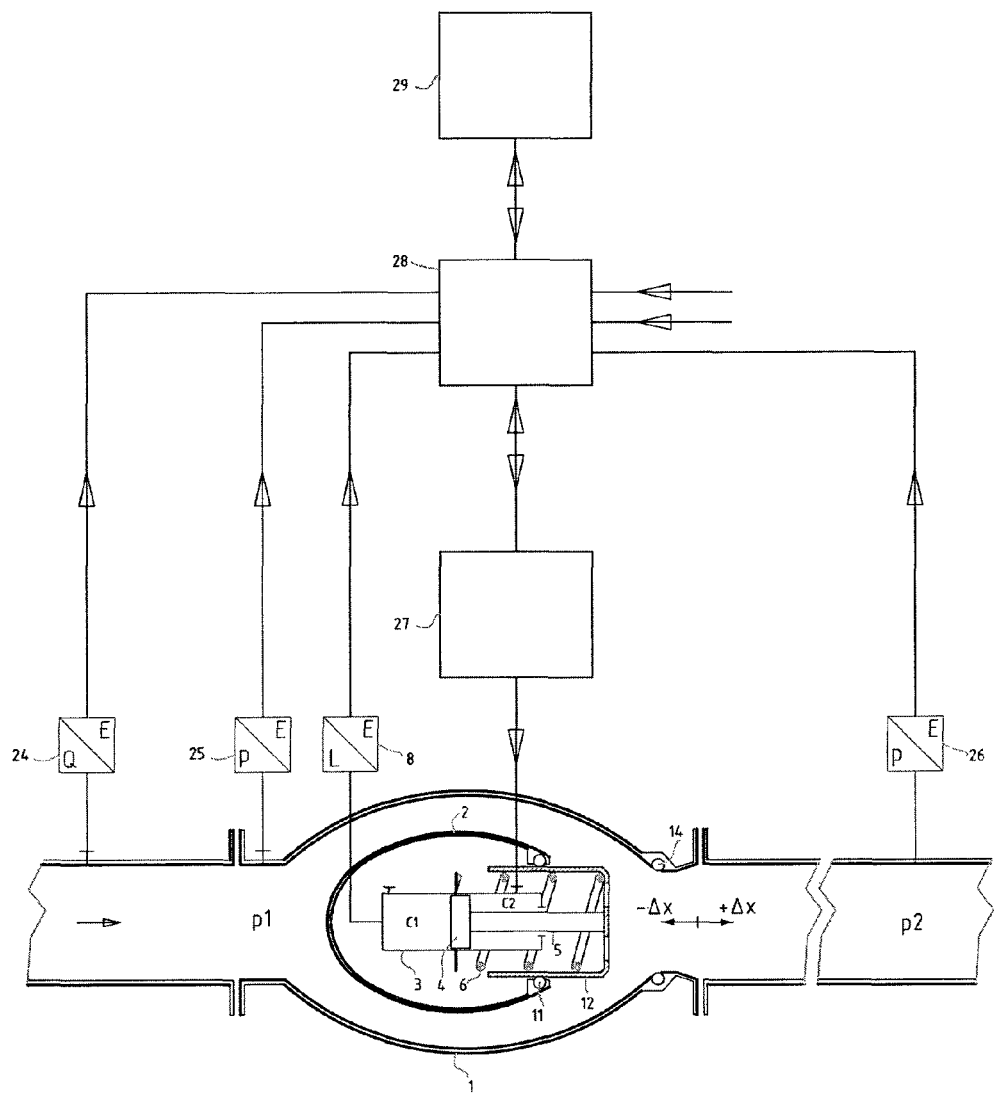
FIGS. 4-29—represent the application of the hydraulic axial piston regulating valve for regulation purposes.

FIG. 4 presents the basic schematic of the regulating valve controlled in a closed loop so that the entire control system including the valve forms a proportional-integral-derivative (hereinafter PID) flow and pressure controller.

The processor of the regulating valve (28) takes and performs commands from a remote control station (29) which changes the input parameters as needed and sends them in form of commands to the regulating valve processor (28). The remote control station (29) controls the default flow rate and fluid pressure $p_2$ by means of the processor (28). In the case of output fluid pressure reduction for a given value $\Delta p_2$ recorded by the output pressure probe (26), the valve processor (28) issues to the pressurized fluid source (27) a command to increase the valve aperture expressed by the shift $\Delta x$, automatically resulting with the output pressure ID, increase. Simultaneously the flow rate through the valve increases, which is recorded by the flow rate gauge (24). If the recorded change of flow rate is in the predetermined limits—it is acknowledged, and if not, the local valve processor (28) performs a correction according to the associated program in order to maintain the default output pressure, flow rate or another parameter or program combination.

When the regulating piston (12) takes a new position, depending on the technical characteristics of the valve itself, a new flow regime through the valve is established where the parameters of this new regime are monitored by:
 the pressure probe (25) for input pressure $p_1$ measurement,
 the pressure probe (26) for output pressure $p_2$ measurement,
 the linear position sensor (8) of the regulating piston (12) position, and
 the flow rate gauge (24).

The data is communicated to the local valve processor (28) and the remote control station (29).

The regulating piston (12) shift in the direction $+\Delta x$ is realized either by the action of the spring (6) or the energy accumulated in the additional source of pressurized fluid for the drive of the hydraulic cylinder (3) or in combination of both, as described earlier. New conditions in the control loop are established in this way and, depending on which parameters are controlled, a complete PID regulation. Other parameters may enter the local valve processor (28) as e.g. the water level in the tank, water temperature or similar, which the valve processor or the computer in the remote control station analyze and take certain actions in order to maintain or to correct them.

One of the examples of the importance of the control of the regulating piston (12) position is in the case when the local valve processor (28) records a relation of flow rate and pressure that is not in accordance with the technical characteristics of the valve for the given valve aperture degree or with the characteristics of the controlled fluid transport line. Such behaviour will cause a warning, and the developed state will be analysed by the corresponding program, corrected or just indicated by a warning, either in the local processor (28) or in the remote control station (29).

EXAMPLE 2

Utilization of External Energy of Compressed Air

Figure 5:
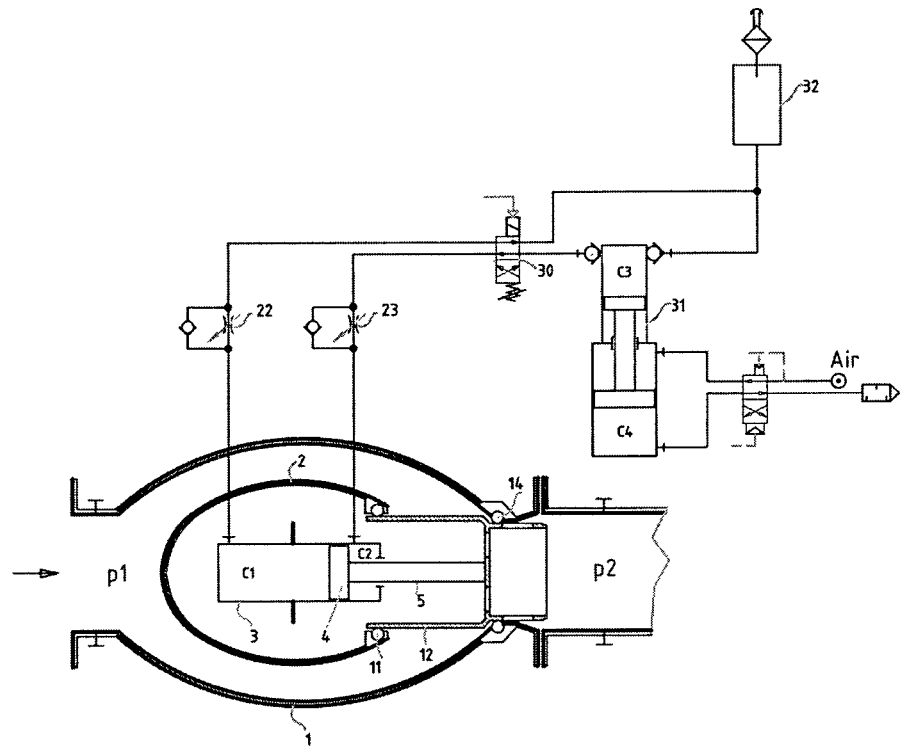

FIG. 5 represents the possibility of the regulating valve drive with external energy in the form of compressed air. Using the pneumo-hydraulic pressure amplifier (31) the regulating piston (12) is moved in either direction. The compressed air is controlled by the piston position in the chamber C4 mechanically connected (by the piston rods of the pistons) with the chamber C3 of the pneumo-hydraulic amplifier (31), by which the energy of compressed air is transformed into the energy of the working fluid. The hydraulic distributor (30) is used for the direction reversing and controls the opening and closing process of the regulating valve (12). In the hydraulic lines there are the throttling check valves (22) and (23) for chambers C1 and C2 of the hydraulic cylinder (3) installed in a manner well known to the state of the art. The system designed like this is double-acting, meaning that the regulating piston (12) is movable in the directions of opening and closing by the pneumo-hydraulic amplifier (31). The possible oil loss in the hydraulic system is automatically replenished from the oil storage tank (32). The described system is especially convenient for use in larger regulating valves.

Figure 6:
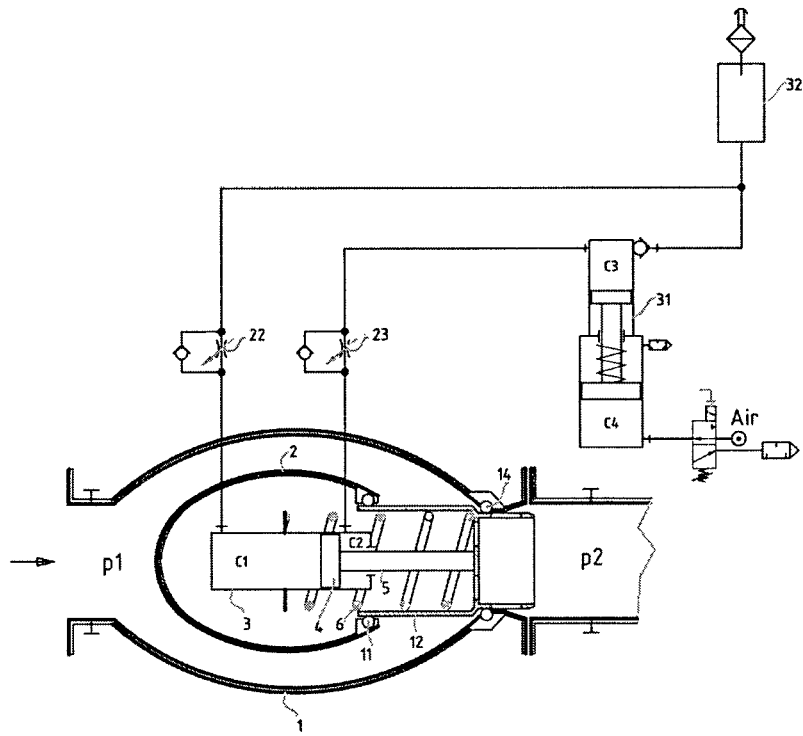

FIG. 6 represents the possibility of driving the regulating valve by means of compressed air and a single-acting pneumo-hydraulic pressure amplifier (31). In comparison to the double-acting system shown in FIG. 5, the difference is that in this case the activation is performed by a simple system with the safety closing by means of the valve spring (6) or, at larger valves, by means of the hydro-accumulator (not shown in FIG. 6) of chamber C1. This solution offers a simple and reliable way of control, especially suitable for the so called "off/on" control of multiple valves from a single compressed air source. Such compressed air activation systems are especially suitable for application in flammable or explosive environments.

EXAMPLE 3

Control Using Manual Pump

Figure 7:
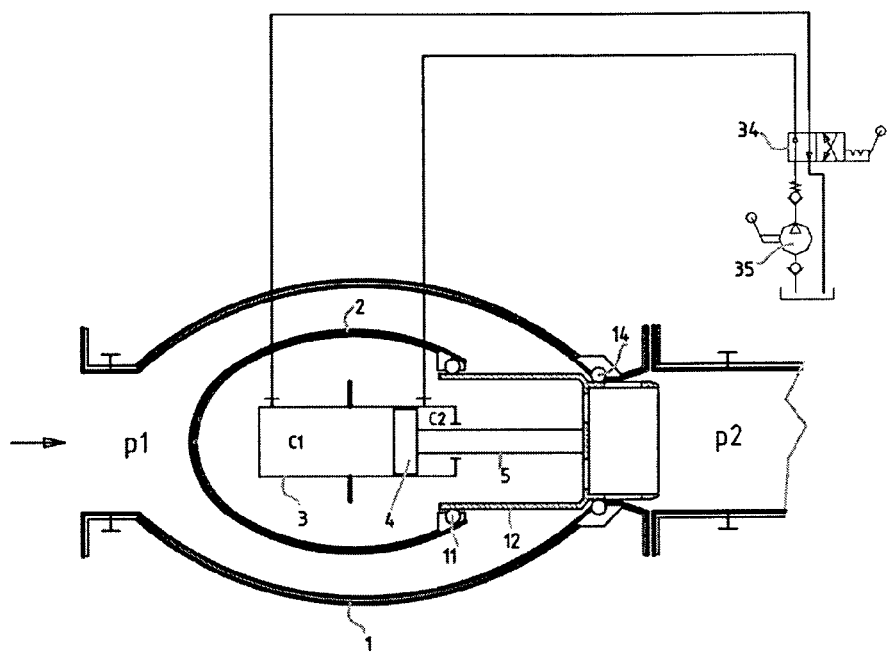
Figure 8:
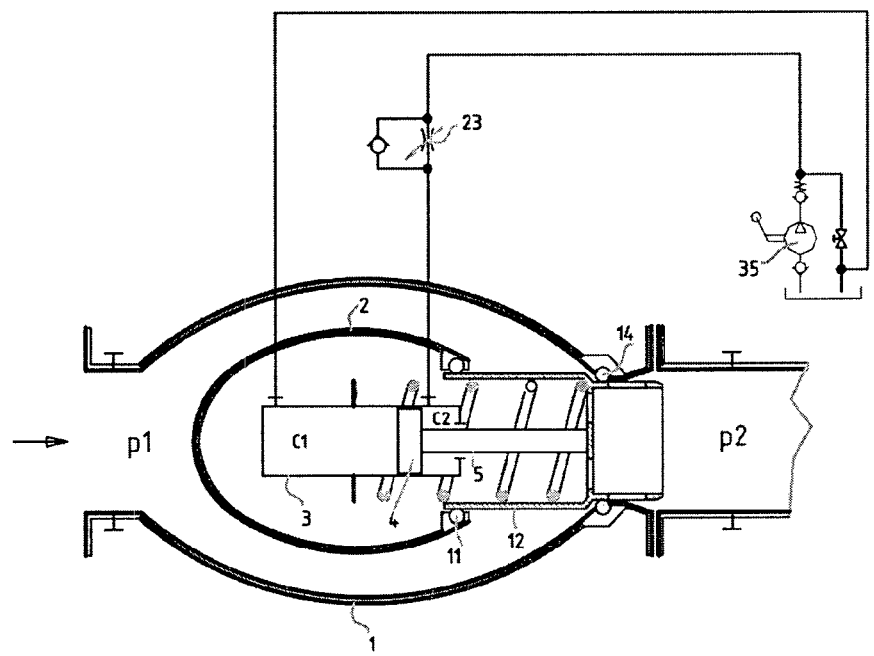

FIG. 7 represents a simple and possibly the most reliable way of double-acting activation and regulation of the piston (12) position using a manual pump (35) and manual hydraulic distributor (34) used for the flow direction reverting from the manual pump (35). FIG. 8 represents the single-action way of activation and positioning of the regulating piston (12) in combination of the manual pump (35) and spring (6). In both cases the energy accumulated in the hydro-accumulator of the chamber C1, which is not shown in the figures, may be additionally used.

This mode can be used in all versions, applications and combinations of the regulating valve as an additional safety mode of activation in the case when a forced manual opening or closing of the valve is needed.

EXAMPLE 4

Function of Check Valve Directly Controlled in the Case of Autonomous Operation

Figure 9:
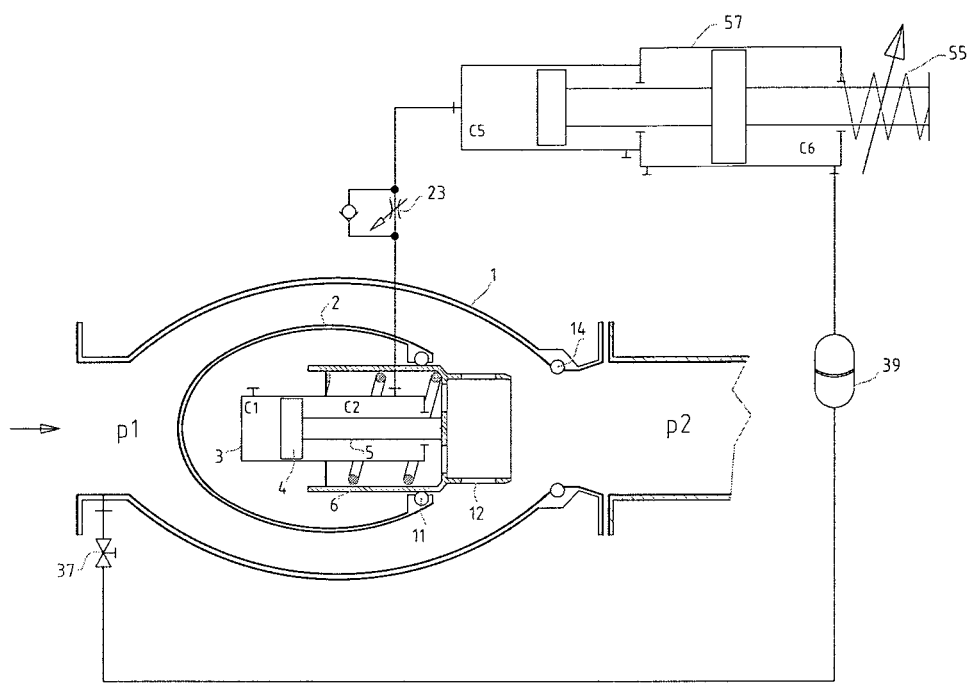

FIG. 9 represents the regulating valve in the role of a check valve for the case of autonomous operation, i.e. operation without participation of external energy, where the valve is put into the safety closed position by means of the energy of the spring (6). The regulating piston (12) gets into the opened position due to the action of the fluid pressure $p_1$ which is via the fluid transmitter (39) and the control cylinder (57) amplified in chamber C5 in relation to the initial pressure in chamber C6 of the said control cylinder. In case of direct activation, the opening pressure of the valve is adjusted by the spring (55) of the control cylinder by compressing the spring (6) of the regulating piston (12). In the closed position of the valve the spring (6) force must be sufficient to produce the sealing force at the positions of the seals (14).

The closing or opening rate of the regulating piston (12), i.e. the regulating valve (1) itself, is adjusted by means of the throttling check valve (23). In the case of electric power failure or pump operation cessation, the pressure $p_1$ drops and the spring (6) close the valve. When the fluid pressure $p_1$ is restored to the working level, the valve opens via the control cylinder (57) as described earlier. Part (37) is the faucet connecting the chamber C6 of the control cylinder (57) via the fluid pressure transmitter (39).

The fluid transmitter (39) separates and transmits the pressure $p_1$ of the fluid flowing through the valve (1) from the control hydraulic oil of chamber C6 of the control cylinder (57).

Figure 10:
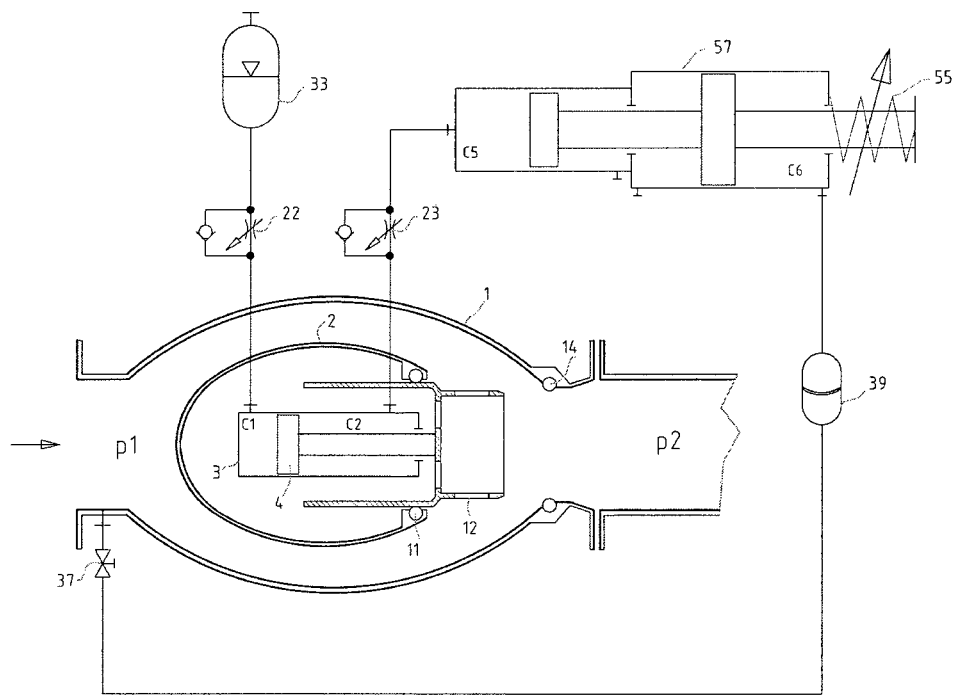

FIG. 10 represents the regulating valve in the role of a check valve in the case of autonomous operation, similar to the situation in FIG. 9, but here the regulating piston (12) is returned to the safety closed position by the energy of the hydraulic accumulator (33) of chamber C1 through the throttling check valve (22). This mode ensures the reliable closing of the valve, especially at larger nominal diameters and higher operating pressures of the valve.

EXAMPLE 5

Function of Check Valve With Pilot Controlled Opening

Figure 11:
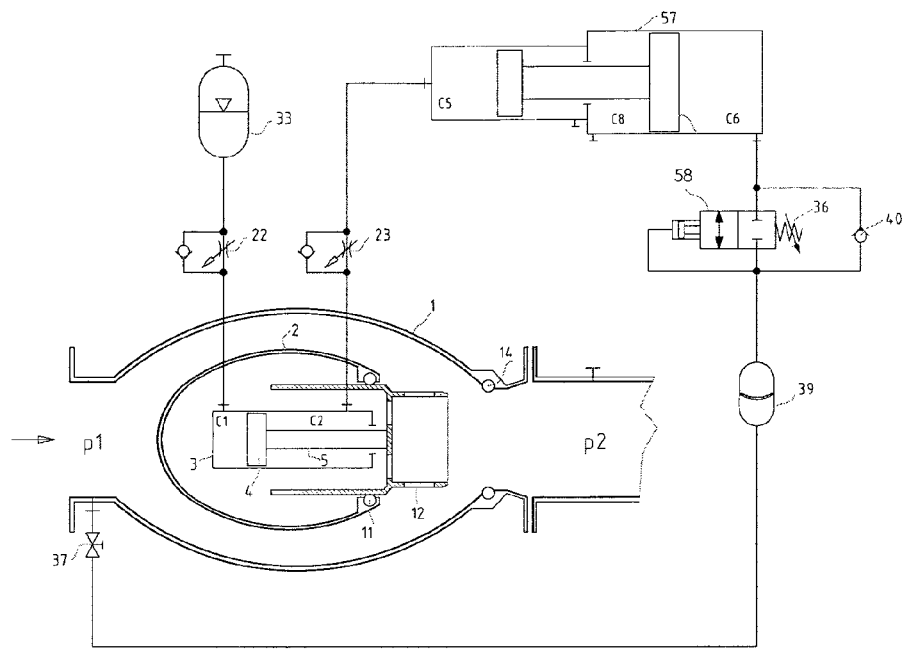

FIG. 11 represents the technical solution of the valve in the role of a pilot controlled check valve from the description of FIG. 9, but in this case the opening is activated indirectly by means of the control valve (58) activated by the input pressure $p_1$, where the control valve (58) is the so called NC ("normally closed") type valve, meaning that the valve is normally closed.

In the displayed situation, at loss of the input pressure $p_1$ the valve (1) is closed via the hydro accumulator (33) and the throttling check valve of chamber C1 (22). When the input pressure $p_1$ rises above the set pressure, the control valve (58) opens and activates via the control cylinder (57) the filling of chamber C2 of the working cylinder (3), thus opening the valve. The activation pressure, i.e. the valve opening pressure, is set by the spring (36) of the control valve.

The fluid transmitter (39) between the faucet (37) and the control valve (58) performs the physical separation and transmission of the pressure $p_1$ of the fluid flowing through the valve (1) from the control hydraulic oil in chamber C6 of the control cylinder (57). The mentioned fluid separation protects the insulated hydraulic control system from the contact with the contaminated fluid flowing through the valve (1). The described solution with pilot control is suitable for a large range of pressures and nominal valve diameters.

Figure 12:
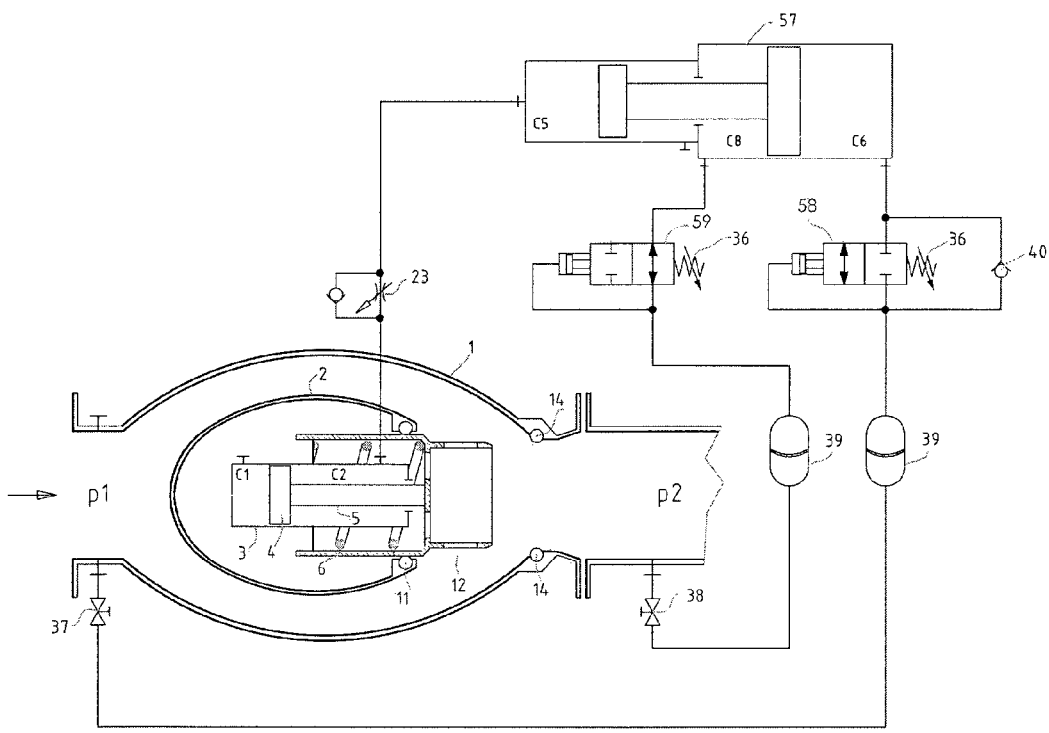

FIG. 12 represents the solution of the valve with the function from the description according to FIG. 9, but here the opening activation is performed by a special control valve (59) activated by the output pressure $p_2$.

The control valve (59), a NO ("normally opened") type valve, is in the normal state in opened position under the influence of the spring (36), which ensures the constant presence of a set pressure in chamber C8 of the control cylinder (57). This design enables that the valve (1) according to the invention may constantly be in a state of set aperture, thus ascertaining the fluid flow through the body (1) in accordance to the settings of springs (36) of the control valves (58) and (59), which maintains the requested pressure P2 at the valve exit.

In the case of increased inlet pressure $p_1$ above the preset value, the exit pressure $p_2$ increases and the valve is additionally opened via the pilot valve (58) because the filling of chamber C2 of the working cylinder (3) commences.

EXAMPLE 6

The Procedure of Forced Valve Closing

Figure 13:
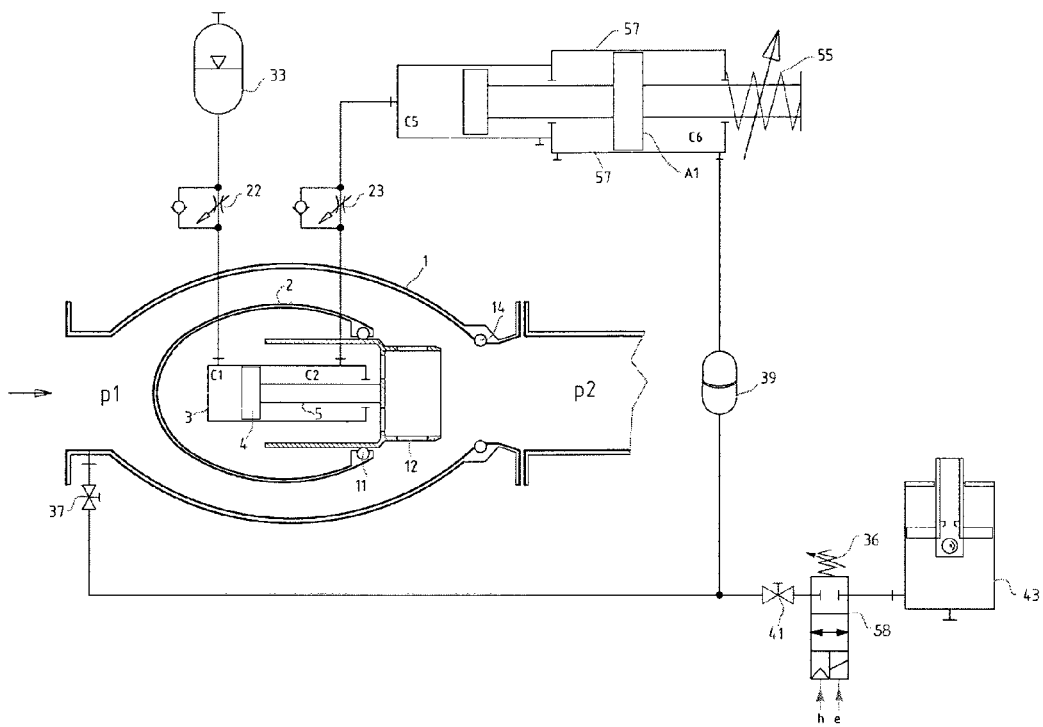

FIG. 13 represents the possibility to realize the forced closing of the regulating valve via the control valve (58) and the fluid receiving vessel (43) by means of external stimulation of the control valve (58).

The external stimulation for the activation of the control valve (58) may be, depending on the design, electrical "e" or mechanical, i.e. hydraulic or pneumatic—indicated by the letter "h".

Figure 14:
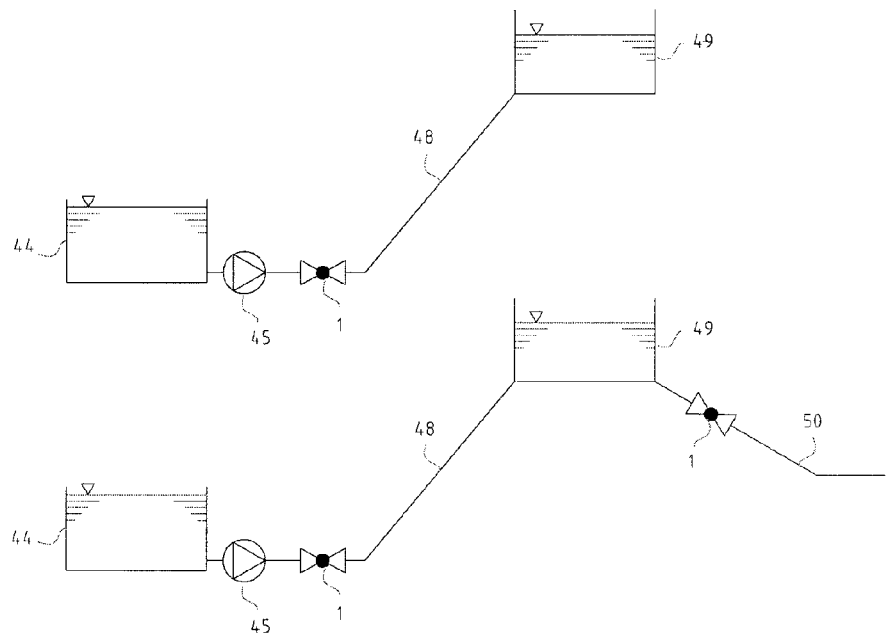

One of the reasons for forced closing of the valve (1) may e.g. be the rupture of the pipeline—pressure line (48) or of the upper tank drain (50), shown in FIG. 14. The rupture causes a sudden flow velocity increase, which is measured using some of the known flow measurement methods. At the same time a certain drop of the exit pressure occurs. The signals from the flow gauge or the fluid pressure gauge excite the control valve(58) which releases and empties swiftly the chamber C6 of the control cylinder (57), thus abruptly decreasing the pressure in chamber C2 at the piston rod (5) side. The faucet (37) is set to perform a pressure drop sufficient to enable on the other side a quick discharging of the fluid from chamber C6 of the control cylinder (57). This makes the pressure in chamber C1 larger than the pressure in C2 and the energy accumulated in the hydraulic accumulator (33) of chamber C1 causes the closing of the valve (1). In this case also the fluid transmitter (39) serves for the pressure $p_1$ transmission and for the protection of the control cylinder (57) while the control valve (58), via the throttling faucet (41), and the fluid receiving tank (43) are in permanent contact with the fluid flowing through the valve. The operating pressures, the activation frequency and the possible discharge of the control fluid known to the state of the art have to be considered at dimensioning the fluid receiving tank.

In FIG. 14 item (45) indicates the fluid pump, item (44) the lower fluid tank and item (49) the upper fluid tank. In the case of decreased pressure $P_1$, valve (1), here having the role of the check valve for the pump (45) protection or for closing the pipeline (50) of the upper tank in case of its rupture, is automatically closed. The valve (1) is controlled in one of the ways discussed earlier and shown in FIGS. 9, 10, 11, 12 and 13.

EXAMPLE 7

Procedure of Valve Closing in Case of Reverse Flow

Figure 15:
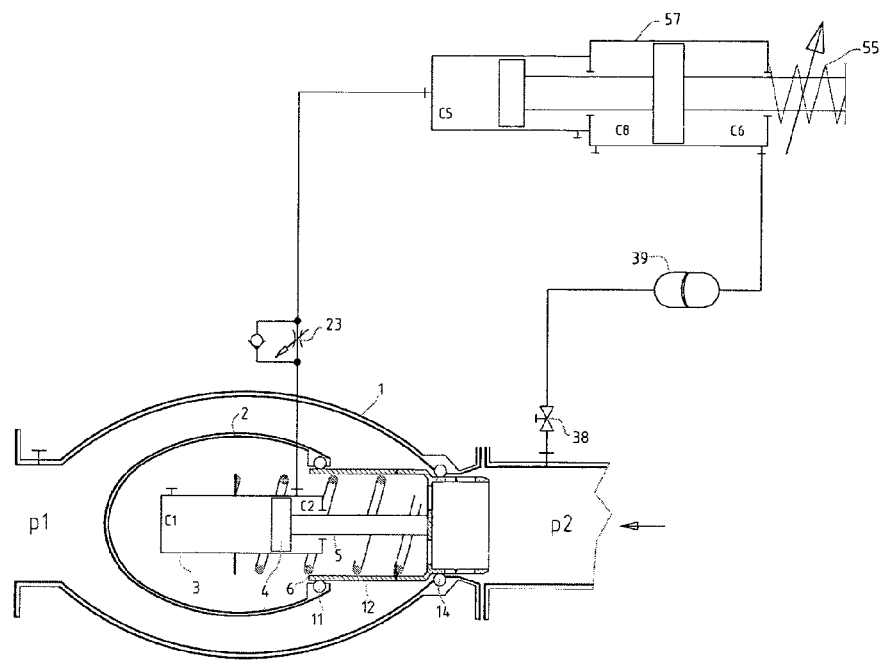

FIG. 15 represents the directly controlled regulating valve (1) in the autonomous operation mode for the case of safety drainage at the occurrence of reverse flow (indicated by the arrow) as a consequence of a hydraulic shock causing a sudden increase of pressure $p_2$.

In the case of hydraulic shock a sudden rise of pressure $p_2$ for the value $\Delta p_2$ takes place, which is transferred via the faucet (38) and fluid transmitter (39) to the control cylinder (57) where it is transformed causing a fast filling of chamber C2 of the working cylinder (3) which opens the valve (1), or more precisely, it draws in the regulating piston (12). The activation pressure for the opening of the working cylinder (3) is directly adjusted with the spring (55) of the control cylinder (57). The opening rate of the regulating piston (12) may be adjusted with the throttling check valve (23). For the protection of the control cylinder from the polluted fluid, the fluid transmitter (39) is mounted.

Figure 16:
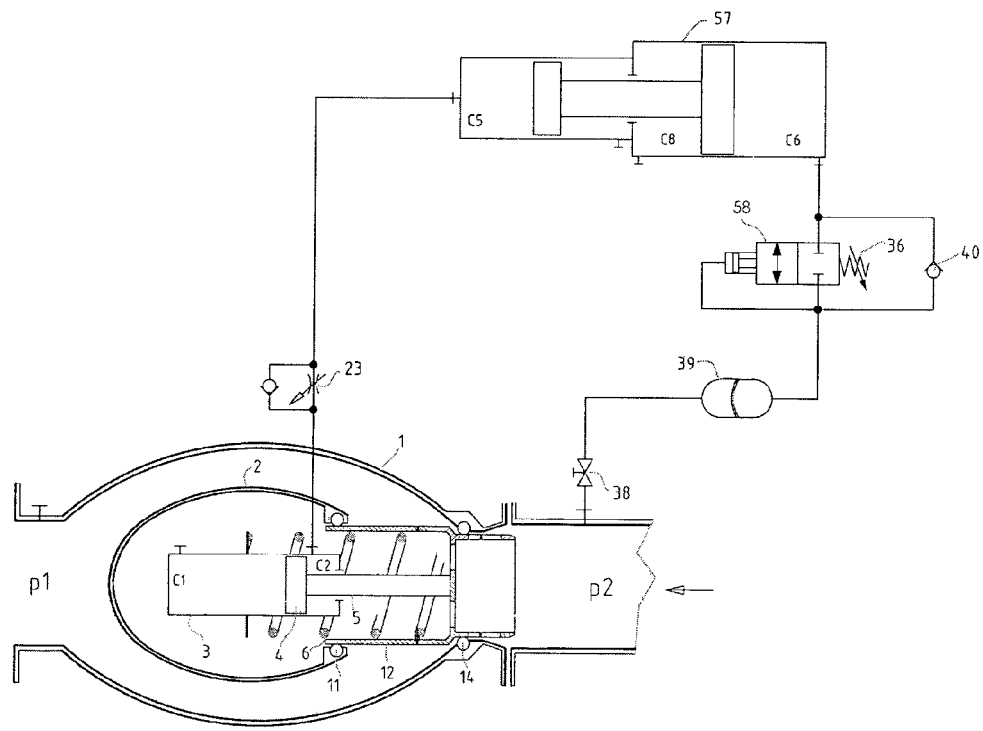

The pilot controlled valve (1) in autonomous operating mode is shown in FIG. 16 for the case of safety drainage at occurrence of reverse fluid flow (indicated by the arrow) as a consequence of hydraulic shock causing a sudden increase of pressure $p_2$. The basic difference in relation to the solution described by FIG. 15 is that the opening activation is realized using pilot control by means of the NC type control valve (58). In idle state, i.e. when under the force of the spring, the control valve (58) is closed. In case of sudden pressure rise for the value $\Delta p_2$ it opens by activation of the control cylinder (57) which drives the hydraulic fluid out of chamber C5 of the control cylinder (57) into C2 of the working cylinder (3), thus moving the piston (4) to open the valve (1).

The pressure at which the control valve (58) starts to fill chamber C6 of the control cylinder (57) is adjusted with the spring (36), while the opening rate can be set by means of the throttling check valve (23). The pressure drop suitable for the control, as well as the filling rate of chamber C6 is set with the faucet (38). When the pressure $p_2$ is restored to the set value, the spring (36) closes the control valve (58), the force equilibrium is re-established enabling the spring (6) force to keep the regulating piston (12) in closed position. The check valve (40) is used to by-pass the control valve (58) in order to lower the resistance to the reversed flow of the hydraulic oil from chamber C6, i.e. provision of reliable valve (1) closing without hydraulic resistance. In this case also, the hydraulic transmitter (39) performs the mentioned protective role of separating the basic and regulating fluids.

Figure 17:
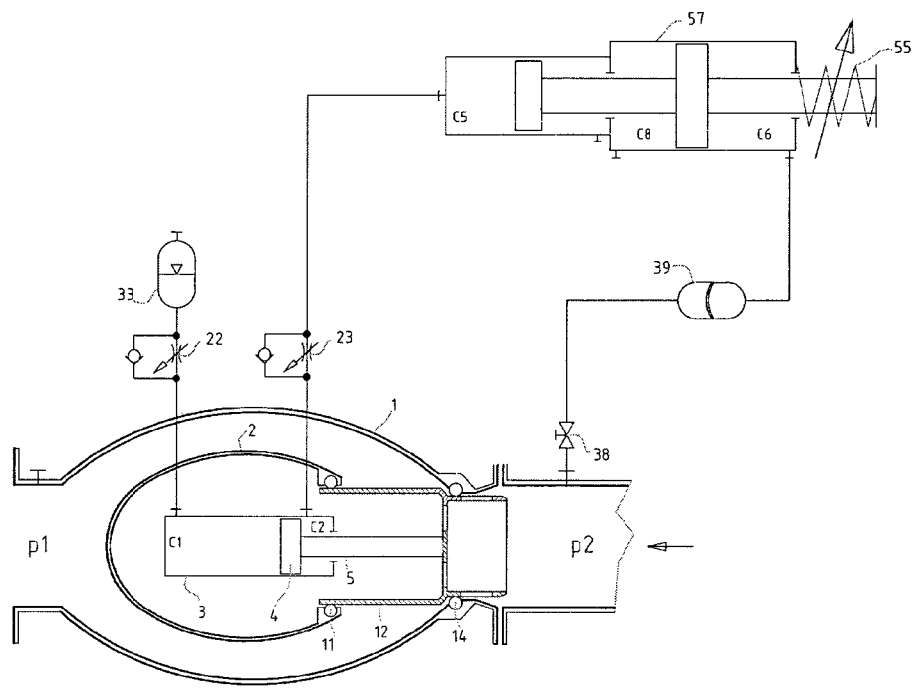

FIG. 17 represents the directly controlled regulating valve (1) in the autonomous operation mode for the case of safety drainage at the occurrence of reverse flow (indicated by the arrow) as a consequence of a hydraulic shock causing a sudden increase of pressure $p_2$. The difference in relation to the solution described by FIG. 15 is that the closing of the valve is achieved with the hydro-accumulator (33), which is a more reliable solution at larger nominal diameters of valves.

Figure 18:
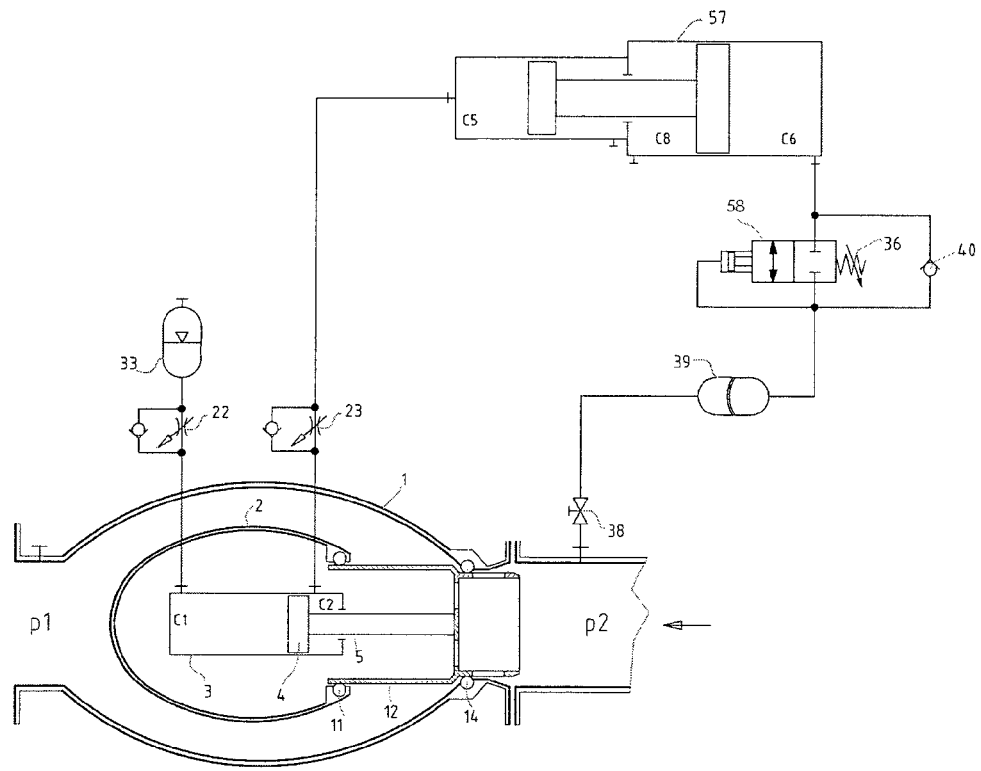

FIG. 18 represents the pilot controlled regulating valve (1) in the same function as in FIG. 16 for the case of fast safety drainage in case of reverse flow due to hydraulic shock. The difference is that here for the valve closing an external hydraulic accumulator is used which realizes the pressure in chamber C1. The solution is suitable for larger nominal diameters and higher valve closing forces just because the mentioned pilot control with the control valve (58). The check valve (40) here also is used to by-pass the control valve (58) in order to reduce the resistance of reverse flow of the hydraulic oil from chamber C6, i.e. provision of reliable valve (1) closing without hydraulic resistance.

Figure 19:
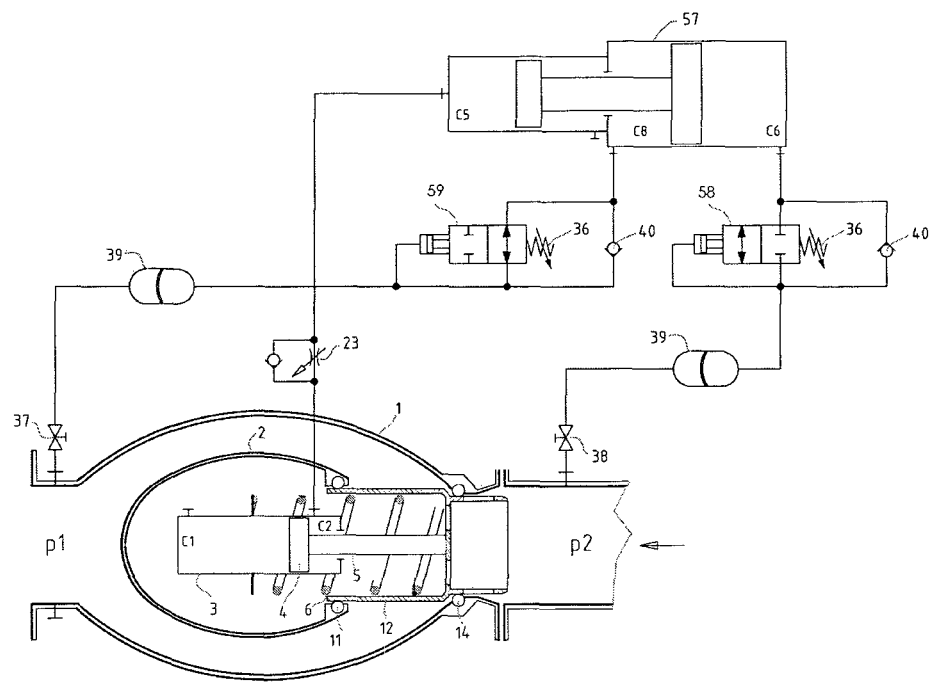

FIG. 19 represents the pilot controlled regulating valve (1), hereby with a double function: protection against hydraulic shock and assurance of fluid flow for a certain state of the relation of the input reverse pressure $p_2$ and output fluid pressure $p_1$ which e.g. may represent the water level in the lower tank. This case of flow may be used at the drainage of the upper tank into the lower one. The valve (1) is opened until in the lower tank the requested pressure $p_1$, i.e. water column is reached. The above mentioned activation pressure setting of the control cylinder (57) is performed using the spring (36) of the NC type control valve (58). The pressure $p_1$ that has to be constantly maintained during the regulation procedure is set with the spring of the second pilot valve (59), which is a NO type valve. When the preset pressure $p_1$ is reached, the control valve (59) is turned over to closed state resulting with the interruption of openness of valve (1), i.e. with the movement of the piston (12) in closing direction. In this way the ratio of pressures $p_1$ and $p_2$ may be constantly kept in the set relation $p_2/p_1$.

Figure 20:
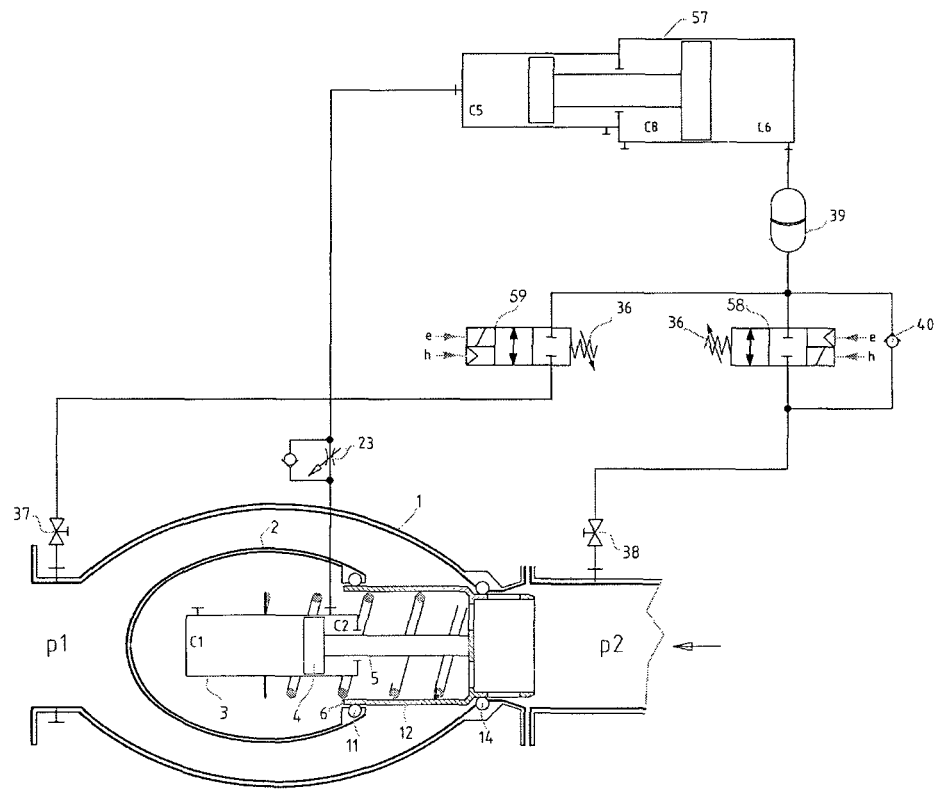

FIG. 20 represents the regulating valve (1) in the role of safety opening and fast drainage of the pipeline in the case of sudden failure of electric power supply for the pumps and similar defects, when conditions for reverse flow and hydraulic shock arise. This design uses the NO type control valve (58) and the NC type valve (59) that are permanently stimulated by electrical, hydraulic, pneumatic or mechanical means.

In the case of failure of electric power and the pumps, conditions of reverse flow and hydraulic shock are created. Then the stimulation of the control valve (58) is automatically interrupted and its spring (36) turns it over into the opened position, when chamber C2 is filled via chambers C6 and C5, i.e. the valve (1) is opened, thus preventing the hydraulic shock.

When an allowed state is re-established, e.g. electric power supply, the control valve (58) is stimulated thus interrupting the flow towards chamber C6. Simultaneously, or in accordance with the control procedure, the closing of valve (1) is started by means of stimulation of the second pilot valve (59) which is a NC type valve, i.e. opened in stimulated state. The process of valve (1) closing itself takes place when the control valve (59) in stimulated state drains chamber C6 of the control cylinder (57) thus permitting the spring (6) of the valve (1) to return the regulating piston (12) into the closed position.

For such system operation of fast drainage, also after the valve closing the condition must be fulfilled that the pressure $p_1$, into which e.g. the pipeline is draining, is lower than pressure $p_2$. In other words, a larger pressure difference enables faster valve (1) closing.

The fluid transmitter (39), in this case also, protects the control cylinder (57), while the design of control valves (58) and (59) must take into consideration the properties of the fluid transported through valve (1).

Like in the earlier described cases of autonomous control, the check valve (40) here also is used to by-pass the pilot valve (59) in order to reduce the reverse flow resistance of the hydraulic oil from chamber C6, i.e. provision of reliable valve (1) closing without hydraulic resistance.

Figure 21:
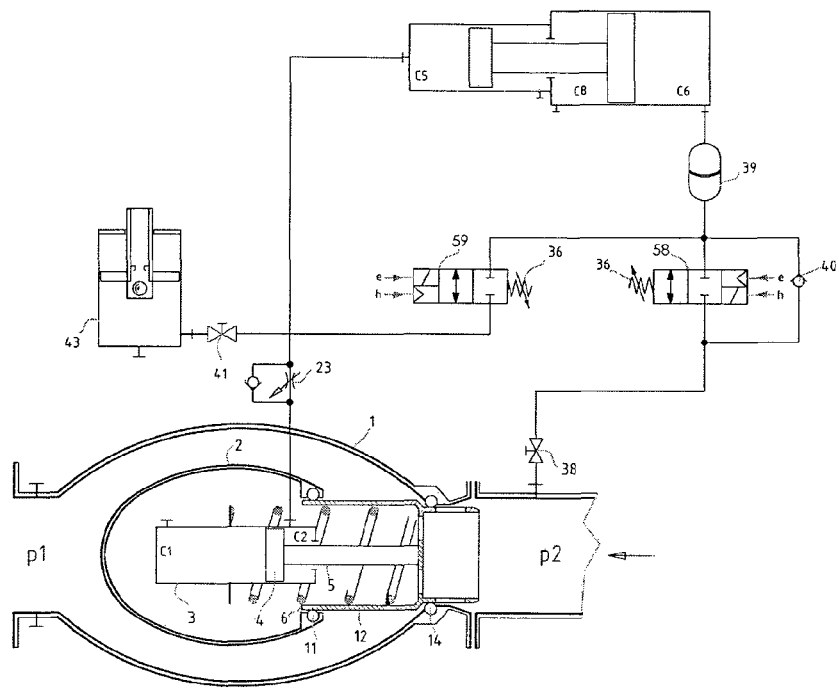

The opening system for fast fluid drainage in FIG. 21 is functionally the same as in the description of FIG. 20 and it is based on stimulation loss of the control valve (58). The differences of design are seen in the reclosing procedure of valve (1), which is performed by means of draining chamber C6 via the pressure transmitter (39) and the control valve (59) into the special fluid receiver (43). This control mode is used at low difference of input and output pressures ($p_2$ and $p_1$), which might influence the reliability of valve (1) reclosing. When dimensioning the fluid receiver (43), the kind of fluid, volume of chamber C6, the fluid pressure and the number of possible valve (1) closings in unit of time has to be taken into account.

Figure 22:
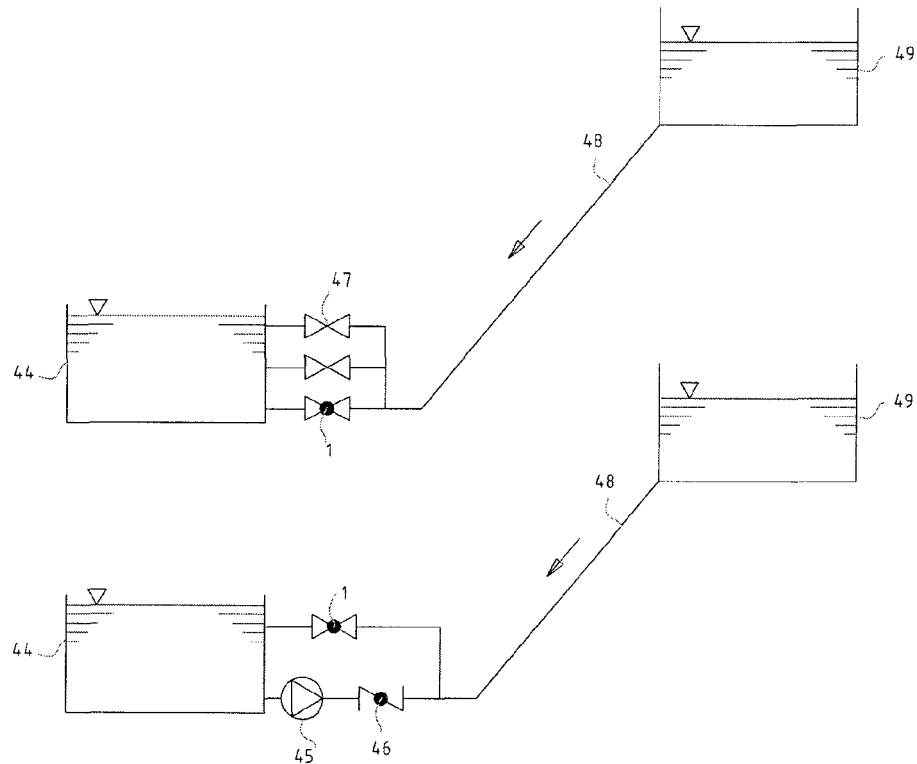

FIG. 22 represents the solution of autonomous application of the regulating valve (1) in the role of the by-pass drainage for keeping the constant pressure difference of the fluids $p_1$ and $p_2$ of the upper (49) and lower (44) fluid tanks. In the specific case in FIG. 22—keeping constant levels of lower and upper tank—the regulating valve (1) plays the role of a by-pass valve for the existing isolating valves, e.g. the gate valve (47) used for the drainage of the upper tank (49) through the pipeline (48) in a swift and high quality way. Item (46) is a butterfly flap valve protecting the pump (45). The drainage of the upper tank (49) and automatic filling of the lower tank (44) may be set for the opening of valve (1) at any fluid pressure difference $p_1 - p_2$ by the design solutions shown in FIG. 19 or in the controllable mode described in FIGS. 20 and 21.

EXAMPLE 8

Application as Pressure Reducing Valve

Figure 23:
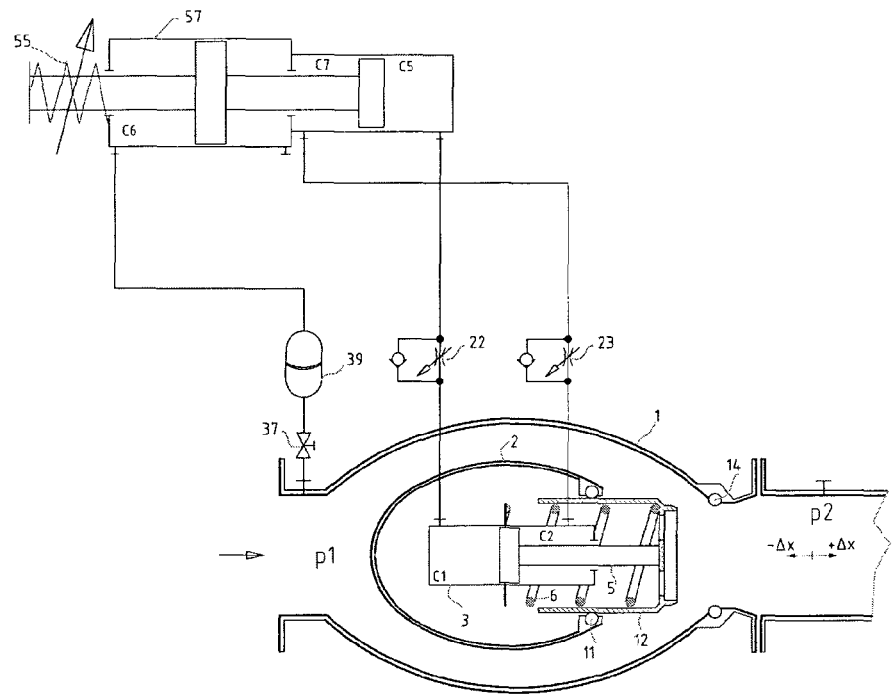

FIG. 23 represents the directly controlled regulating valve (1) in the autonomous operating mode of a standard pressure reducing valve with the task of reduction of input pressure $p_1$ and keeping the output pressure $p_2$ at a constant set value. The spring (55) of the control cylinder (57) is used to set the pressure in chamber C1 of the working hydraulic cylinder (3) and herewith a certain openness of the regulating valve (1), resulting with the corresponding set pressure $p_2$. When the input fluid pressure $p_1$ is increased for a certain amount $\Delta p_1$ the transformed hydraulic pressure is transmitted via the fluid transmitter (39) to the chamber C6 of the control cylinder (57), and from it into chamber C1 of the working cylinder (3), connected to chamber C5 and chamber C2 of the working cylinder, connected to chamber C7. The output pressure $p_2$, setting is performed by tightening/loosing the spring (55) of the control cylinder (57), which sets the output pressure $p_2$ by the shift of the regulating piston (12) in the directions $-\Delta x/+\Delta x$, which leads to the increase/decrease of pressure $p_2$ and its further keeping at the set value, i.e. $p_2$=const.

In case of input fluid pressure $p_1$ drop in relation to the set value, by action of the spring (55) of the control cylinder (57) the hydraulic pressure in chamber C1 of the hydraulic working cylinder (3) drops resulting with the shift of the regulating piston (12) for $-\Delta x$, thus performing the needed opening of the regulating valve and keeping the set output pressure, i.e. $p_2$=const.

The directly controlled pressure reducing valves in the described design are practical for small and medium size valves, which is mainly limited by the spring (55) of the control cylinder (57).

Figure 24:
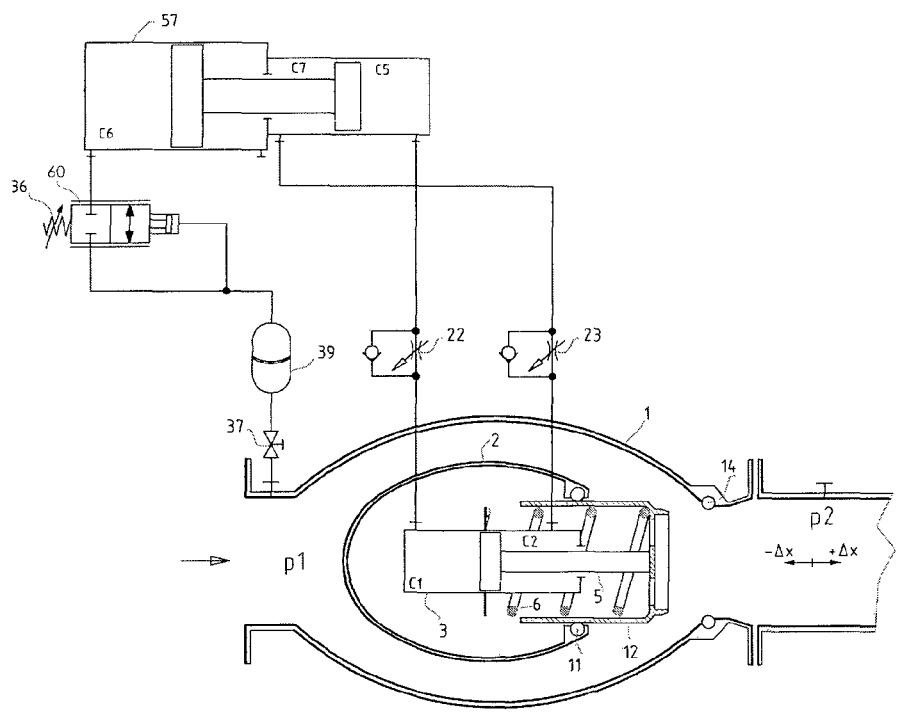

FIG. 24 represents the pilot controlled regulating valve (1) in the basic operating mode as described with FIG. 23. The difference here is in the fact that the control cylinder (57) control and therewith the regulation of the input and output pressures is performed by means of a special controllable valve (60) of the proportional type. The requested pressure $p_2$ to be kept at the valve output is set with the spring (36) of the valve (60). The pilot controlled pressure reducing valve (1) is used for more demanding regulation tasks, especially at valves with larger nominal diameters and broader regulation pressure spans.

Figure 25:
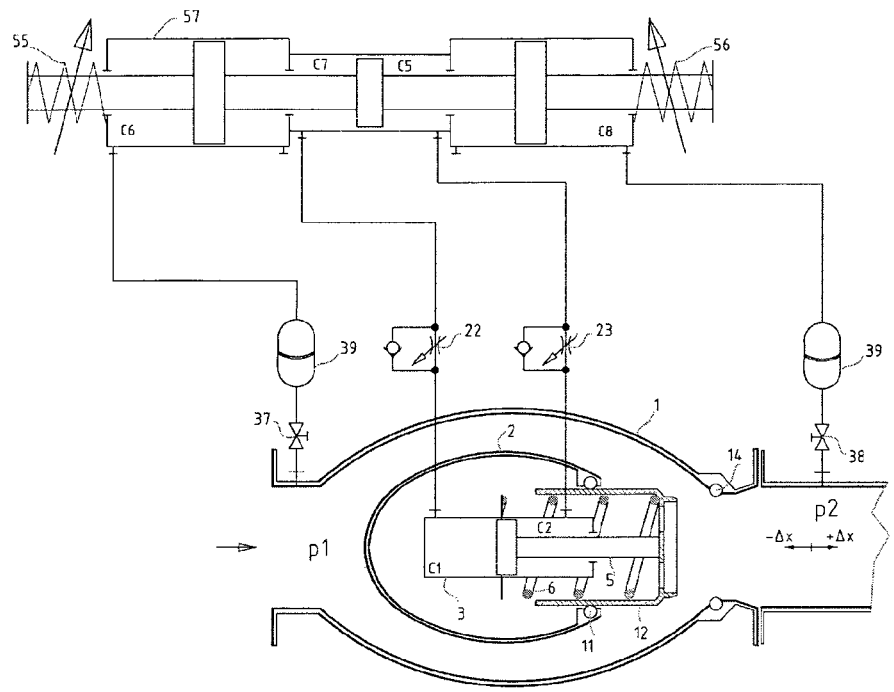

FIG. 25 represents the regulating valve in the role of reduction of the input pressure $p_1$ to a certain output pressure $p_2$ but also for keeping their difference at a certain proportional set value. The difference of the input and output fluid pressures $p_1$ and $p_2$ depends on the opening degree of the valve, and it is adjusted by means of the hydraulic control cylinder (57), more precisely by the springs (55) and (56). When a input pressure $p_1$ rise for a certain value $+\Delta p_1$ occurs, the hydraulic pressure in the chamber C2 of the working cylinder (57) rises via the control cylinder (57) and a new balance of pressure values in chambers C1 and C2, opening the valve for $-\Delta x$, which increases the output fluid pressure $p_2$ for $+\Delta p_2$. In this way the pressure ratio $p_1/p_2$ is kept constant in accordance with the set characteristics of the springs (55) and (56) of the control cylinder (57) which control the valve opening and closing.

Figure 26:
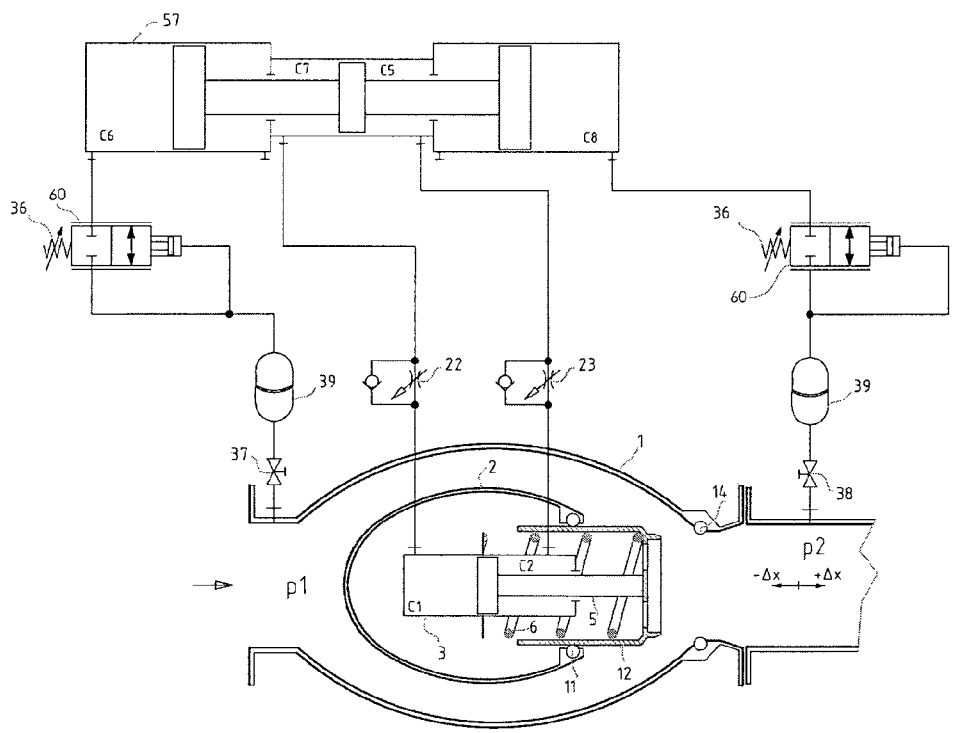

FIG. 26 represents the pilot controlled regulating valve (1) with the basic operating mode as described with FIG. 25. The difference consists in the fact that the control cylinder (57) control is performed via the springs (36) of the proportional type control valves (60), which are hydraulically activated. The requested pressure $p_2$ to be kept constant is adjusted by means of the springs (36). The pilot controlled pressure reducing valve (1) is used for more demanding regulation tasks, especially at larger nominal valve diameters and broader regulating pressure ranges. The fluid transmitters (39), as in the rest of the schematics, perform the separation of the fluid transported through the valve (1) and the hydraulic oil used in the regulation and setting system of the valve. In this way a higher quality degree, reliability and long lasting use with reduced maintenance costs are achieved.

Figure 27:
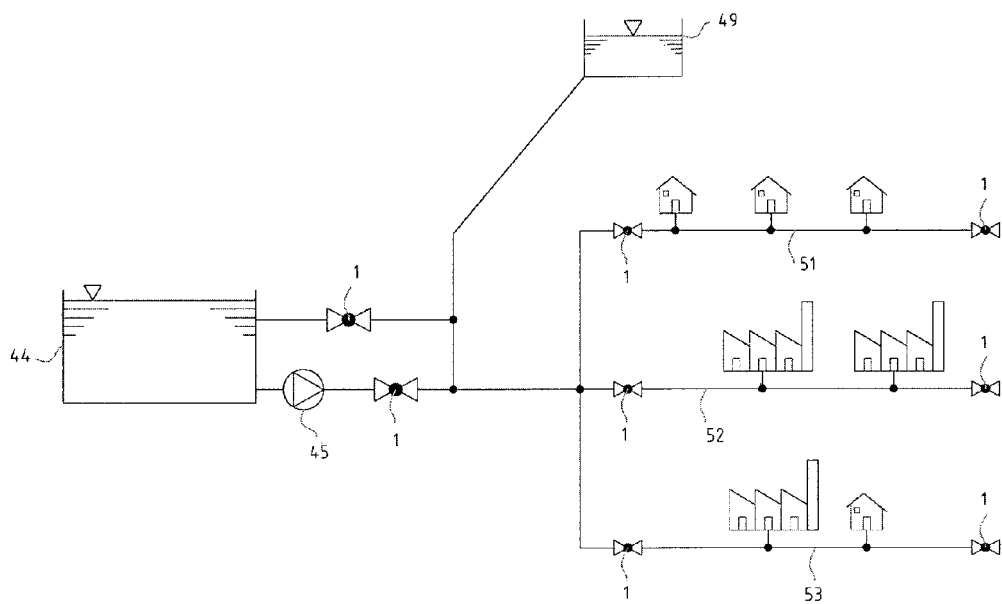

FIG. 27 represents the multiple applicability of the regulating valve (1) in autonomous operating mode for the standard pressure adjustment among various consumers. The valve may be used as a pressure reduction valve at the beginning of pipeline branches of private (51) users, industrial (52) and combined (53) consumers, and as hydraulic shock protection at the end of the lines.

The consumers in lines (51), (52) and (53) are supplied from a single pumping facility consisting of the fluid pump (45), valve (1) acting as the check valve for the pump protection (connected to the pump (45) in series), and the valve (1) parallel to the pump (45) acting as system protection against hydraulic shock and of the tank (44), as shown in e.g. FIG. 15.

EXAMPLE 9

Figure 28:
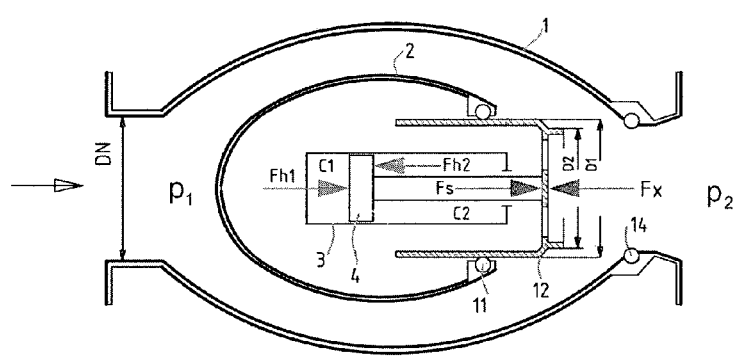

Force Calculation for the Valve Opened, Closed and in Intermediate Positions FIG. 28 displays the forces and pressures in the opened valve (1), as well as for a certain intermediate position of the regulating piston (12) of the valve (1). In the earlier discussed examples 1 to 8, at the adjustment of the valve operating range, i.e. the relation of spring forces (6), hydro-accumulator (33), or at the described direct control of spring (55) forces of the control cylinder (57), or at the pilot control of transformed fluid forces, when opening or closing the valve—it must be taken into consideration that the fluid axial force $F_x$ acting on the regulating piston (12)—see FIG. 28—is not a constant value during the regulation play.

The axial force varies in direction and intensity according to the formula:

$$F_x = C_{FX} \cdot (DN^2 \cdot \pi/4) \cdot (p_1 - p_2)$$

where the parameter $C_{FX}$ represents the axial force coefficient, which is calculated according to hydromechanical equations, and DN is the nominal valve diameter.

The performed numerical hydromechanical analyses of the axial force coefficient established that the axial force acting on the regulating piston (12) suddenly changes direction just before the closing of the valve. That means that in the major part of the operating range the fluid "drags" the regulating piston (12) in the flow direction, and "pushes" it back just before closing. The maximal value of the axial force is only 10% of the product of pressure difference and area of the regulating piston (12) head.

Figure 29:
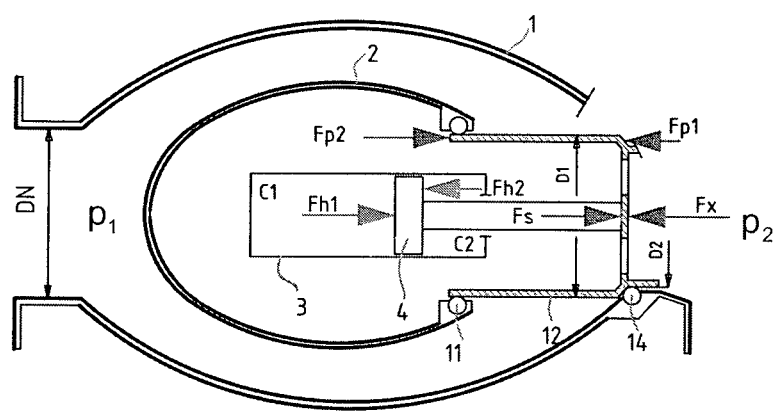

This fact is extremely important for the autonomous mode of the valve operation, i.e. without external energy. There the condition of equilibrium of forces acting on the regulating piston in an intermediate position must be fulfilled. It reads:

$$F_x = F_{h1} - F_{h2} + F_s$$

i.e., according to FIG. 29 for the closed position of the regulating valve:

$$F_x = F_{p2} - F_{p1} + F_{h1} - F_{h2} + F_s$$

where the used symbols mean:

$F_{h1}$—hydraulic pressure force in chamber C1 of cylinder (3)
$F_{h2}$—hydraulic pressure force in chamber C2 of cylinder (3)
$F_{p1}$—external pressure $p_1$ force
$F_{p1}$—resulting pressure $p_2$ force acting at both sides of the regulating piston (12)
$F_s$—force of spring (6) or hydro-accumulator $D_1$ and $D_2$ are the essential dimensions of the regulating piston (12) that is drawn into the central part of the body (2)—$D_1$ and the sealing part that enters into the output valve part (15)—$D_2$. The numerical analyses have shown an extraordinary efficiency of the valve (1) according to the present invention for application in regulation examples 1 to 8.

It must be stated that in all application aspects described in examples 2 to 8 the linear position sensor may be electrical or mechanical, according to the requirements of the monitoring of the regulation process performed with the valve being the subject of this invention.

It is clear to the expert in this field of technology that in examples 2 to 8 the fluid pressure transmitter (39) is not necessary in systems transporting so called "clean fluids", oil, gas, crude oil, drinking water etc. This means that instead the said fluid pressure transmitter (39), for the regulation in autonomous operation the pressure of the fluid transported in the basic pipeline and whose flow is regulated by the said valve may be used. Such "clean" working fluid that is transported by the pipeline enters the input chambers of the control cylinder (57) directly or via one or more control valves (58), (59), (60); while the hydraulic circuit of the output chambers of the control cylinder (57) and the hydraulic cylinder (3) is entirely separated from the working fluid.

Industrial Applicability

The industrial applicability of the invention as a regulating and cut-off valve for the regulation of flow and pressure in system for the transport of water, air, gas and oil is undisputable and obvious, especially when large transports per unit of time are in question. The practical purpose is in all applications where a reliable, linear and reproducible fluid flow control is needed.

REFERENCES

1—Valve (valve body)
2—Central part of valve body
3—Hydraulic cylinder
4—Piston of cylinder
5—Piston rod
6—Valve spring
7—Cover of linear sensor
8—Linear position sensor
9—Longitudinal guides (of regulating piston)
10—Hydraulic cylinder head
11—Piston seal between (12) and (2)
12—Regulating piston
13—Nut fastening (12) to (5)
14—Seal between (15) and (12) in closed position of valve
15—Exit part of valve
16—Ribs
17—Hydraulic channels
18—Borings for guides (of linear position sensor)
19—Measured distance
20—Magnetostrictive waveguide (probe)
21—Permanent magnet of electrical linear position sensor
22—Throttling check valve of chamber C1

23—Throttling check valve of chamber C2
24—Flow rate gauge
25—Pressure probe
26—Pressure probe
27—Source of pressurized fluid
28—Processor of regulating valve
29—Remote control station
30—Hydraulic distributor for direction reversal
31—Single-acting and double acting pneumo-hydraulic pressure amplifier
32—Hydraulic oil tank
33—Hydraulic accumulator of chamber C1
34—Manual hydraulic distributor
35—Manual pump
36—Spring of control valve
37—Faucet
38—Faucet
39—Fluid pressure transmitter
40—Check valve
41—Throttling faucet of pilot valve (58)
43—Fluid receiving tank
44—Lower fluid tank
45—Pump
46—Butterfly flap
47—Faucet or some other type of isolating device
48—Pressure line
49—Upper fluid tank
50—Upper tank drainage
51—Private users pipeline branch
52—Industrial consumers pipeline branch
53—Combined consumers pipeline branch
55—Spring for pressure adjustment in chamber C6
56—Spring for pressure adjustment in chamber C8
57—Control cylinder
58—NC type control valve
59—NO type control valve
60—Proportional type control valve

The invention claimed is:

1. A hydraulic axial piston regulating valve, said valve comprising:
a valve body (1) and a central part (2) around which flows a fluid when said valve is in an opened state, and where said central part (2) is connected by one or more ribs (16) with said valve body (1), where said ribs (16) are equipped with hydraulic channels (17) and additional channels for guides (18);
said central part (2) with a hydraulic cylinder (3) in communication with said hydraulic channels (17) inside which there is a hydraulic piston body (4) and a piston rod (5) to which a regulating piston (12) is connected;
one or more seals (11) continuously sealing between said central part (2) and said regulating piston (12), and one or more seals (14) between said regulating piston (12) and an exit part of said valve (15), which seal only when said valve is closed;
a linear position sensor (8) of said regulating piston (12) being positioned centrally inside said hydraulic cylinder (3) of said central part (2) of said valve;
movement of said regulating piston (12) being defined with regard to said piston rod (5); and
said regulating piston (12) being equipped with grooves and borings for hydrostatic unloading of said regulating piston (12), and
wherein said linear position sensor (8) provides electrical conversion of a distance (19) into a measurable value which is transmitted through one or more of said borings (18) drilled in said ribs (16) by wires and conducted from said central part (2) of said valve body (1), and said linear position sensor (8) is closed up by a cover (7) of said valve,
wherein data acquired from said linear position sensor (8) on said regulating piston (12) position is additionally numerically processed in a regulating valve processor (28), and
wherein said valve is utilized for instances of reversed fluid flow or hydraulic shock, where driving energy is provided by working fluid via a faucet (38), and via a fluid pressure transmitter (39) said driving energy is led to a control cylinder (57), directly or via control valves, and said control cylinder (57) controls said hydraulic cylinder (3) via a throttling check valve (23).

2. The valve according to claim 1, wherein
said regulating piston (12) has in its head a spring (6) which at one side thrusts against an outside of said hydraulic cylinder (3), and at an opposite side against an inside bottom of said regulating piston (12); and
said spring (6) has an elastic energy sufficient to safely place said regulating piston (12) into a position to close completely fluid flow through said valve in case of pressure loss in said hydraulic channels (17).

3. The valve according to claim 1, wherein return of said regulating piston (12) into its closed position uses only hydraulic pressure from an external source of pressurized fluid (27).

4. The valve according to claim 1, wherein said valve is utilized in closed loop PID regulation where said regulating valve processor (28), autonomously or according to instructions from a remote control station (29), executes protocol according to acquired data from pressure probes (25, 26), flow gauge (24) and said linear position sensor (8), and where for closing of said valve energy of said spring (6) or energy accumulated in an external fluid pressure source (27) or their combination is used.

5. The valve according to claim 1, wherein movement of said regulating piston (12) in both directions is done by compressed air with aid of a pneumo-hydraulic pressure amplifier (31).

6. The valve according to claim 1, wherein positioning of said regulating piston (12) is controlled by a manual pump (35).

7. The valve according to claim 1, wherein said control cylinder (57) is pilot controlled by at least one of said control valves (58, 59) connected to said working fluid via said fluid pressure transmitter (39).

8. The valve according to claim 7, wherein said control cylinder (57) is controlled by means of additional stimulation at said control valve (58) connected to a fluid receiving vessel (43).

9. A hydraulic axial piston regulating valve, said valve comprising:
a valve body (1) and a central part (2) around which flows a fluid when said valve is in an opened state, and where said central part (2) is connected by one or more ribs (16) with said valve body (1), where said ribs (16) are equipped with hydraulic channels (17) and additional channels for guides (18);
said central part (2) with a hydraulic cylinder (3) in communication with said hydraulic channels (17) inside which there is a hydraulic piston body (4) and a piston rod (5) to which a regulating piston (12) is connected;
one or more seals (11) continuously sealing between said central part (2) and said regulating piston (12), and one or more seals (14) between said regulating piston (12) and an exit part of said valve (15), which seal only when said valve is closed;

a linear position sensor (8) of said regulating piston (12) being positioned centrally inside said hydraulic cylinder (3) of said central part (2) of said valve; and movement of said regulating piston (12) being defined with regard to said piston rod (5); and said regulating piston (12) being equipped with grooves and borings for hydrostatic unloading of said regulating piston (12), wherein said linear position sensor (8) provides electrical conversion of a distance (19) into a measurable value which is transmitted through one or more of said borings (18) drilled in said ribs (16) by wires and conducted from said central part (2) of said valve body (1), and said linear position sensor (8) is closed up by a cover (7) of said valve, wherein data acquired from said linear position sensor (8) on said regulating piston (12) position is additionally numerically processed in a regulating valve processor (28), and wherein said valve is utilized as a check-valve during autonomous operation, where driving energy is provided by working fluid via a faucet (37), and via a fluid pressure transmitter (39) said driving energy is led to a control cylinder (57), directly or via control valves, and said control cylinder (57) controls said hydraulic cylinder (3) via a throttling check valve (23).

10. The valve according to claim 9, wherein said control cylinder (57) is pilot controlled by at least one of said control valves (58, 59) connected to said working fluid via said fluid pressure transmitter (39).

11. The valve according to claim 10, wherein said control cylinder (57) is controlled by additional stimulation at said control valve (58) connected to a fluid receiving vessel (43).

12. The valve according to claim 11, wherein said valve is utilized in a safety connection enabling forced closing upon rupture of a pressure line (48).

13. A hydraulic axial piston regulating valve, said valve comprising:

a valve body (1) and a central part (2) around which flows a fluid when said valve is in an opened state, and where said central part (2) is connected by one or more ribs (16) with said valve body (1), where said ribs (16) are equipped with hydraulic channels (17) and additional channels for guides (18);

said central part (2) with a hydraulic cylinder (3) in communication with said hydraulic channels (17) inside which there is a hydraulic piston body (4) and a piston rod (5) to which a regulating piston (12) is connected;

one or more seals (11) continuously sealing between said central part (2) and said regulating piston (12), and one or more seals (14) between said regulating piston (12) and an exit part of said valve (15), which seal only when said valve is closed;

a linear position sensor (8) of said regulating piston (12) being positioned centrally inside said hydraulic cylinder (3) of said central part (2) of said valve; and movement of said regulating piston (12) being defined with regard to said piston rod (5); and said regulating piston (12) being equipped with grooves and borings for hydrostatic unloading of said regulating piston (12), wherein said linear position sensor (8) provides electrical conversion of a distance (19) into a measurable value which is transmitted through one or more of said borings (18) drilled in said ribs (16) by wires and conducted from said central part (2) of said valve body (1), and said linear position sensor (8) is closed up by a cover (7) of said valve, wherein data acquired from said linear position sensor (8) on said regulating piston (12) position is additionally numerically processed in a regulating valve processor (28), and wherein said valve is utilized to reduce an input pressure p1 to an exit pressure p2 and for maintaining their difference at a proportional value, where driving energy is provided by working fluid from one or more faucets (37, 38), and where via corresponding fluid pressure transmitters (39) said pressures p1 and p2 are led to a control cylinder (57), directly or via control valves, and said control cylinder (57) controls operation of said hydraulic cylinder (3), which drives a regulating piston (12), via throttling check valves (22, 23).

14. The valve according to claim 13, wherein said control cylinder (57) is pilot controlled by means of one or two proportional control valves (60) connected via said corresponding fluid pressure transmitters (39) to said working fluid via said faucets (37, 38).

15. The valve according to claim 14, wherein all hydraulic lines are free from said fluid pressure transmitters (39) and said working fluid enters input chambers of said control cylinder (57), directly or via one or more control valves (58, 59, 60), while a hydraulic circuit of output chambers of said control cylinder (57) and said hydraulic cylinder (3) are completely separated from said working fluid.

* * * * *